United States Patent
Kitamura

(10) Patent No.: US 8,281,057 B2
(45) Date of Patent: Oct. 2, 2012

(54) INFORMATION PROCESSING APPARATUS, HOST BUS ADAPTOR AND CONTROL METHOD

(75) Inventor: Takaaki Kitamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 427 days.

(21) Appl. No.: 12/402,164

(22) Filed: Mar. 11, 2009

(65) Prior Publication Data

US 2009/0234993 A1    Sep. 17, 2009

(30) Foreign Application Priority Data

Mar. 17, 2008  (JP) ................................. 2008-067713

(51) Int. Cl.
    *G06F 13/12* (2006.01)
    *G06F 13/38* (2006.01)

(52) U.S. Cl. ............................................. 710/72; 713/2

(58) Field of Classification Search .................... 710/72; 713/2

See application file for complete search history.

(56) References Cited

U.S. PATENT DOCUMENTS

| | | | |
|---|---|---|---|
| 6,105,130 A * | 8/2000 | Wu et al. ............................ | 713/2 |
| 6,735,715 B1 * | 5/2004 | Graham ........................ | 714/5.11 |
| 6,763,455 B2 * | 7/2004 | Hall .................. | 713/1 |
| 6,976,100 B2 * | 12/2005 | Dirstine et al. ................. | 710/54 |
| 7,519,696 B2 * | 4/2009 | Blumenau et al. ............. | 709/221 |
| 7,669,190 B2 * | 2/2010 | Konda et al. .................... | 717/128 |
| 2001/0020254 A1 * | 9/2001 | Blumenau et al. ............. | 709/229 |
| 2005/0097324 A1 | 5/2005 | Mizuno | |
| 2006/0168276 A1 * | 7/2006 | Black et al. .................... | 709/230 |

FOREIGN PATENT DOCUMENTS

| | | |
|---|---|---|
| JP | 01-54228 | 6/1989 |
| JP | 2000-339268 | 12/2000 |
| JP | 2005-135124 | 5/2005 |

OTHER PUBLICATIONS

Japanese Office Action mailed Jul. 3, 2012 issued in corresponding Japanese Patent Application No. 2008-067713 (3 pages) (2 pages English translation).

* cited by examiner

*Primary Examiner* — Elias Mamo
(74) *Attorney, Agent, or Firm* — Staas & Halsey LLP

(57) ABSTRACT

An information processing apparatus includes a first host bus adaptor that has a first storage section and expands the function of the information processing apparatus. Multiple first input/output devices are connected to the first host bus adaptor. A first firmware issues a first inquiry to each of the first multiple input/output devices and stores a first response to the first inquiry obtained from each of the first multiple input/output devices in the first storage section. A second host bus adaptor has a second storage section and expands the function of the information processing apparatus. Multiple second input/output devices are connected to the second host bus adaptor. A second firmware issues a second inquiry to each of the second multiple input/output devices independently from the first inquiry and holds a second response to the second inquiry obtained from each of the second multiple input/output devices in the second storage section.

12 Claims, 24 Drawing Sheets

FIG. 3

| Byte/Bit | 7 | 6 | 5 | 4 | 3 | 2 | 1 | 0 |
|---|---|---|---|---|---|---|---|---|
| 0 | Peripheral Qualifier | | | | Peripheral Device Type | | | |
| 1 | RMB | Device-Type Modifier | | | | | | |
| 2 | ISO Version | | ECMA Version | | | ANSI-Approved Version | | |
| 3 | AENC | TrmIOP | Reserved | | | Response Data Format | | |
| 4 | Additional Length (n-4) | | | | | | | |
| 5 | Reserved | | | | | | | |
| 6 | Reserved | | | | | | | |
| 7 | RelAdr | WBus32 | WBus16 | Sync | Linked | Reserved | CmdQue | SftRe |
| 8 | (MSB) | Vendor Identification | | | | | | |
| 15 | | | | | | | | (LSB) |
| 16 | (MSB) | Product Identification | | | | | | |
| 31 | | | | | | | | (LSB) |
| 32 | (MSB) | Product Revision Level | | | | | | |
| 35 | | | | | | | | (LSB) |
| 36 | Vendor Specific | | | | | | | |
| 55 | | | | | | | | |
| 56 | Reserved | | | | | | | |
| 95 | | | | | | | | |
|  | Vendor-Specific Parameters | | | | | | | |
| 96 | Vendor Specificn | | | | | | | |
| n | | | | | | | | |

FIG. 5

11f : TARGET INFORMATION MANAGEMENT TABLE

| TARGET ID | LUN |
|-----------|-----|
| 0 | 0 |
| 0 | 1 |
| 1 | 0 |
| 1 | 1 |
| 1 | 2 |
| 2 | 0 |
| ⋮ | ⋮ |

FIG. 7

| Byte/Bit | 7 | 6 | 5 | 4 | 3 | 2 | 1 | 0 |
|---|---|---|---|---|---|---|---|---|
| 0 | colspan="8" Operation Code(12h) |||||||||
| 1 | Logical Unit Number ||| Reserved |||| EVPD |
| 2 | Page Code ||||||||
| 3 | Reserved ||||||||
| 4 | Allocation Length ||||||||
| 5 | Control ||||||||

FIG. 23

| cstat/Bits | 7 | 6 | 5 | 4 | 3 | 2 | 1 | 0 |
|---|---|---|---|---|---|---|---|---|
| cstat[0] | common control ||||||||
| cstat[1] | rqst ident | reserved |||||||
| cstat[2] | reserved ||||||||
| Cstat[3] | reserved |||||| rqst fail | reserved |

INFORMATION PROCESSING APPARATUS, HOST BUS ADAPTOR AND CONTROL METHOD

CROSS-REFERENCE TO RELATED APPLICATIONS

This application is based upon and claims priority to prior Japanese Patent Application No. 2008-67713 filed on Mar. 17, 2008 in the Japan Patent Office, the entire contents of which are incorporated herein by reference.

BACKGROUND OF THE INVENTION

1. Field of the Invention

An embodiment of the invention discussed herein relates to a function expansion apparatus, such as a host bus adaptor, an information processing apparatus, such as a sever, and a method for controlling such an information processing apparatus.

2. Description of the Related Art

In a computer, such as a server, as an information processing apparatus, when the main power supply therefore is turned on, the BIOS (Basic Input/Output System) performs a diagnostic process for checking whether there is not any problem on devices on the mother board. Then, by acquiring device information about input/output devices connected to the computer, the BIOS performs a detection process for recognizing the input/output devices and, after that, activates the operating system.

The acquisition of the device information is performed by the BIOS requesting it from a function expansion apparatus, such as a host bus adaptor, which operates as an initiator. Receiving the request, the initiator makes inquiries to the input/output devices connected to itself. When the input/output devices which have received the inquiries as targets give device information about themselves as responses to the initiator, the initiator hands the given device information to the BIOS.

The initiator makes an inquiry to each of the multiple targets one by one. Once the initiator makes an inquiry to one target, it waits for a predetermined period of time even if a response is not given from the target. Furthermore, in the case where multiple initiators are mounted in the computer, the BIOS requests acquisition of device information from the next initiator after one initiator ends the inquiry process.

Therefore, there is a problem that, in the case where multiple initiators are mounted on a computer, and a great number of input/output devices are connected to each initiator, a lot of time is required until the operating system is activated. See generally, Patent Document 1: Japanese Laid-Open Patent Publication No. 2005-135124.

SUMMARY OF THE INVENTION

According to an aspect of an embodiment of the invention, an information processing apparatus includes a first host bus adaptor has a first storage section and expands the function of the information processing apparatus, first multiple input/output devices connected to the first host bus adaptor, first firmware issues a first inquiry to each of the first multiple input/output devices and holds a first response to the first inquiry obtained from each of the first multiple input/output devices in the first storage section, a second host bus adaptor has a second storage section and expands the function of the information processing apparatus, second multiple input/output devices connected to the second host bus adaptor and second firmware issues a second inquiry to each of the second multiple input/output devices independently from the first inquiry and holds a second response to the second inquiry obtained from each of the second multiple input/output devices in the second storage section.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a block diagram of inquiry data;
FIG. 5 is a diagram schematically depicting a target information management table;
FIG. 7 is a diagram of the format of an inquiry command;
FIG. 23 is a diagram of the format of an SES command.

DETAILED DESCRIPTION OF THE PREFERRED EMBODIMENTS

Now, description will be made on seven examples of a computer system, which is an embodiment of an information processing system, with reference to accompanying drawings.

First Embodiment

Figure 1:
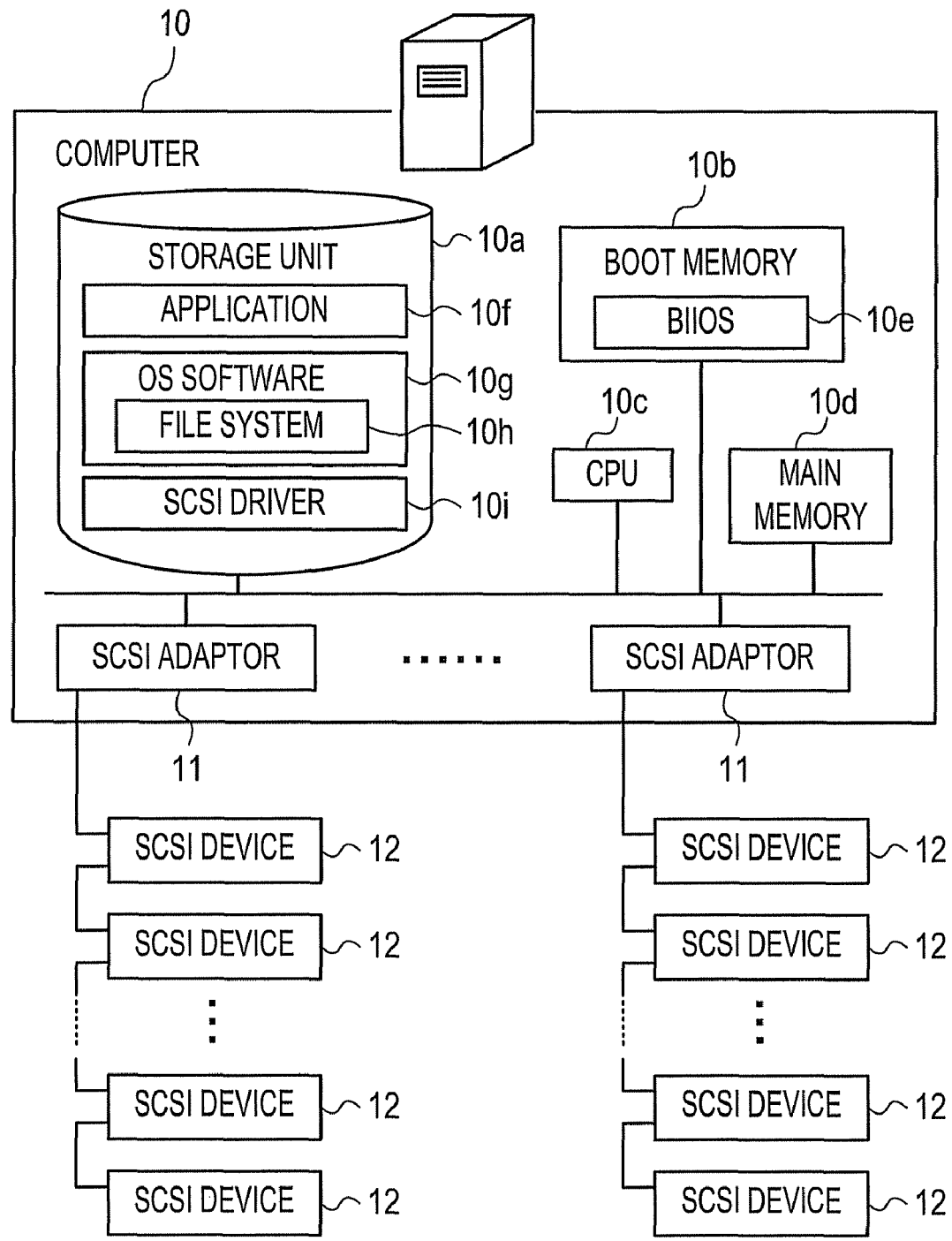
FIG. 1 is a block diagram of a computer system of a first embodiment.

FIG. 1 is a block diagram of a computer system of a first embodiment. As depicted in FIG. 1, the computer system of the first embodiment includes a computer 10 and multiple SCSI (Small Computer System Interface) devices 12 connected to the computer 10. Among these, the computer 10 is provided with a storage unit 10a, a boot memory unit 10b, a CPU (Central Processing Unit) 10c, a main memory unit 10d, and SCSI adaptor units 11.

The storage unit 10a is a unit for recording various kinds of software, various kinds of programs and various kinds of data. The boot memory unit 10b is a unit in which BIOS (Basic Input/Output System) software 10e to be executed after the main power supply is turned on (after the system is activated) is recorded. As the boot memory unit 10b, there is, for example, a flash memory. The CPU 10c is a unit which performs processing in accordance with programs in the storage unit 10a and the boot memory unit 10b. The main memory unit 10d is a unit for the CPU 10c to cache a program or data or develop a work area. The SCSI adaptor unit 11 is a unit which adds an interface for connecting the SCSI devices 12, to a computer as an expanded function, and it is a so-called a host bus adaptor.

In the computer system of the first embodiment, the computer 10 is provided with multiple SCSI adaptor units 11 as depicted in FIG. 1. To each of the multiple SCSI adaptor units 11, multiple SCSI devices 12 are connected via a SCSI bus cable. Thus, the computer 10 corresponds to an example of the information processing apparatus embodying the embodiments of the invention.

The computer 10 stores an application software 10f and OS (Operating System) software 10g in the storage unit 10a. The application 10f is software for realizing a particular function by using general-purpose functions provided from the OS software 10g. The OS software 10g provides APIs (Application Programming Interfaces) and ABIs (Application Binary Interfaces) for various kinds of applications. Furthermore, the OS software 10g performs management of storage areas of the storage unit 10a and the main memory unit 10d, management of processes and tasks, file management, and provision of utilities, such as various kinds of setting tools and an editor, for the applications. Furthermore, the OS software 10g also performs allocation of windows to multiple tasks for multiplexing screen output. The OS software 10g includes file system software 10h. The file system software 10h is software which provides a name management function, an area management function and a file access management function. The name management function is a function of managing a file classification system (namespace) as a directory, and the area management function is a function of managing association between a file and a disk block. The file access management function is a function of executing file access using the name management function and the area management function in response to a file access request from the application 10f.

Furthermore, the computer 10 stores a SCSI driver 10i in the storage unit 10a. The SCSI driver 10i is a program which controls SCSI communication between the BIOS software 10e and/or the OS software 10g and the SCSI devices 12.

The SCSI device 12 is a device provided with a function of inputting and outputting data and a connection interface for performing communication in accordance with the SCSI standard. Therefore, the SCSI device 12 corresponds to an example of the input/output device.

Figure 2:
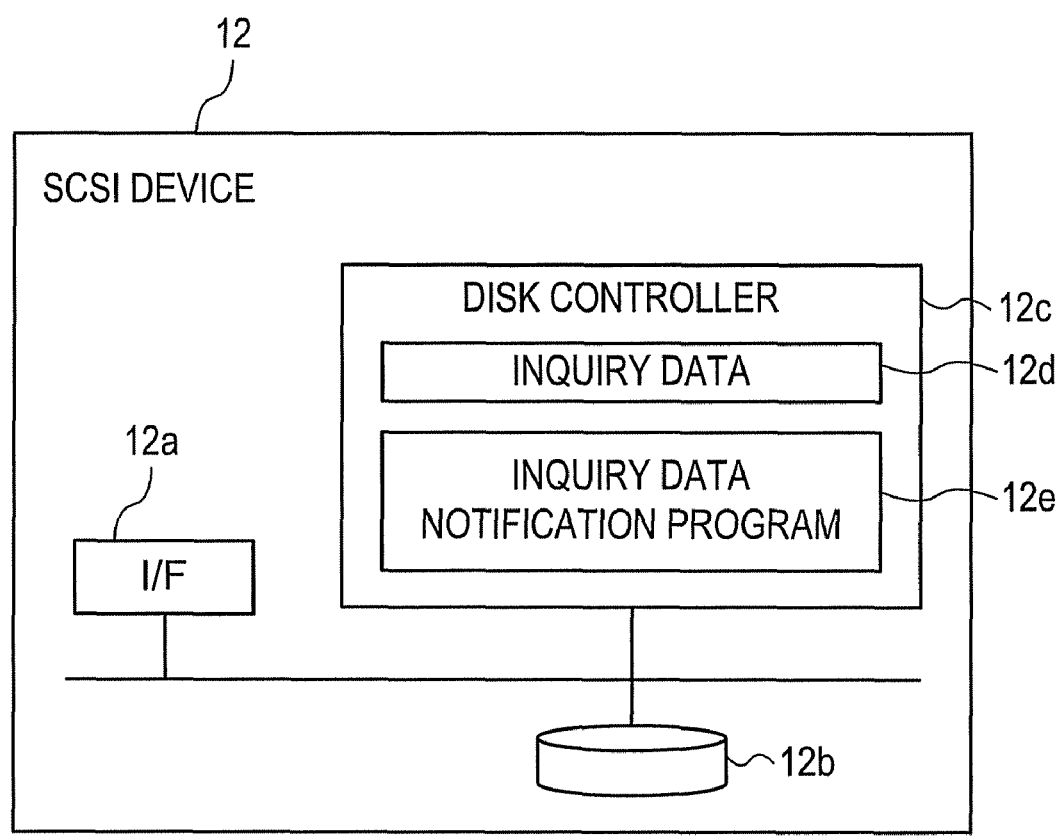
FIG. 2 is a diagram depicting an example of the configuration of a SCSI device.

FIG. 2 is a diagram depicting an example of the configuration of the SCSI device 12. The SCSI device 12 depicted in FIG. 2 is a disk device, and it is provided with an I/F (interface) unit 12a, a disk unit 12b and a disk controller 12c. The I/F unit 12a is a unit which performs communication in accordance with the SCSI standard. The disk unit 12b is a unit provided with multiple disk media for recording various kinds of programs and various kinds of data. The disk controller 12c is a unit which controls reading/writing a program or data to/from the disk media. This disk controller 12c is mainly provided with a ROM (Read Only Memory), a CPU and a RAM (Random Access Memory) though they are not depicted. The ROM stores software for performing communication in accordance with the SCSI standard. This software includes inquiry data 12d as device information about the SCSI devices 12. Furthermore, this software includes an inquiry data notification program 12e which gives the inquiry data 12d as a target in response to an inquiry command, one of SCSI commands.

FIG. 3 is a block diagram of the inquiry data 12d. However, since the inquiry data 12d is well known, description thereof is omitted.

Figure 4:
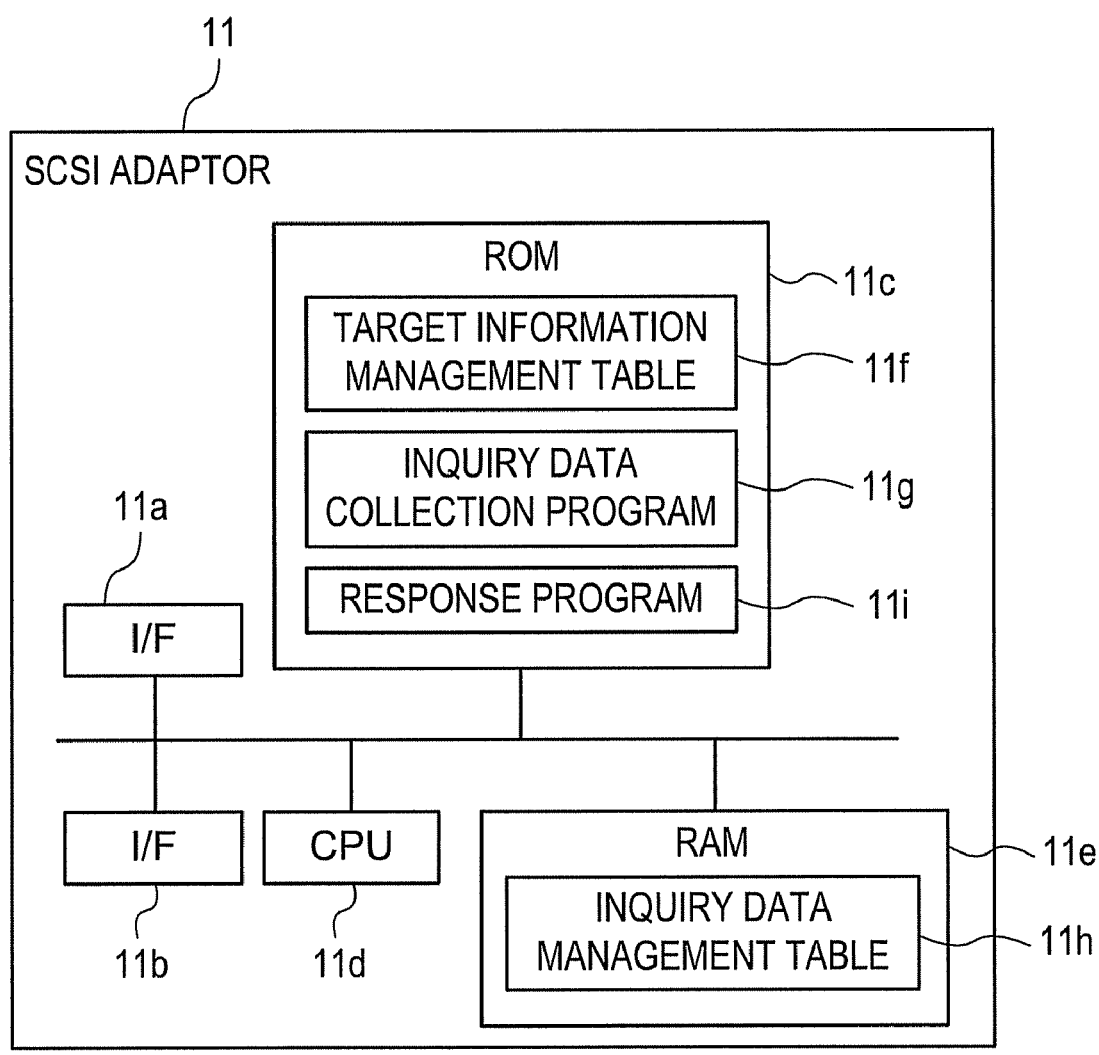
FIG. 4 is a block diagram of a SCSI adaptor unit.

FIG. 4 is a block diagram of the SCSI adaptor unit 11. As depicted in FIG. 4, the SCSI adaptor unit 11 is provided with I/F (interface) units 11a and 11b, a ROM unit 11c, a CPU 11d and a RAM unit 11e. The first I/F unit 11a is a unit which exchanges data with units in the computer 10, such as the CPU 10c. The second I/F unit 11b is a unit which performs communication in accordance with the SCSI standard. The SCSI devices 12 are connected to this I/F unit 11b. The ROM unit 11c is a unit in which programs and data are recorded. The CPU 11d is a unit which performs processing in accordance with the programs in the ROM unit 11c. The RAM unit 11e is a unit where the CPU 11d caches a program or data or develops a work area.

The SCSI adaptor unit 11 stores software for performing communication in accordance with the SCSI standard, in the ROM unit 11c. This software is set as an initiator in the first embodiment. A target information management table 11f and an inquiry data collection program 11g are added to this software. The target information management table 11f is a table where information is recorded which uniquely identifies each target of a host bus adapter, for example, in the case where the SCSI adaptor unit 11 targets SCSI devices 12 connected thereto.

FIG. 5 is a diagram schematically depicting the target information management table 11f. As depicted in FIG. 5, each record in the target information management table 11f has fields of "target ID (Identification)" and "LUN (Logical Unit Number)". The "target ID" field is a field in which identification information uniquely identifying the SCSI device 12 is recorded. The "LUN" field is a field in which identification information uniquely identifying a disk medium in the SCSI device 12 is recorded. Each record in the target information management table 11f may have fields other than the above-described two fields.

The inquiry data collection program 11g depicted in FIG. 4 is a program which collects the inquiry data 12d from the multiple SCSI devices 12. The details of the contents of the inquiry data collection process will be described later with reference to FIG. 6. An inquiry data management table 11h is generated in the RAM unit 11e by the inquiry data collection process. The inquiry data management table 11h is a table for managing the inquiry data 12d collected from the SCSI devices 12. Therefore, the RAM unit 11e corresponds to an example of the storage section described above.

The software which the SCSI adaptor unit 11 stores in the ROM unit 11c includes a response program 11i. Here, description will be made on the operation of the response program 11i performed when a request is given from the BIOS software 10e in the boot memory unit 10b and/or the file system software 10h in the OS software 10g. In this case, the response program 11i reads the inquiry data 12d of a specified target from the inquiry data management table 11h generated in the RAM unit 11e and gives the inquiry data 12d as a response to the request source. The response program 11i is automatically activated by the CPU 11d when the power supply of the SCSI adaptor unit 11 is turned on.

The software which the SCSI adaptor unit 11 stores in the ROM unit 11c is firmware which is fixedly recorded in the ROM unit 11c.

In the SCSI adaptor unit 11, the inquiry data collection program 11g is automatically activated by the CPU 11d when the power supply of the SCSI adaptor unit 11 is turned on. Furthermore, when the inquiry data collection program 11g is activated, the inquiry data collection process is started by the CPU 11d.

Figure 6:
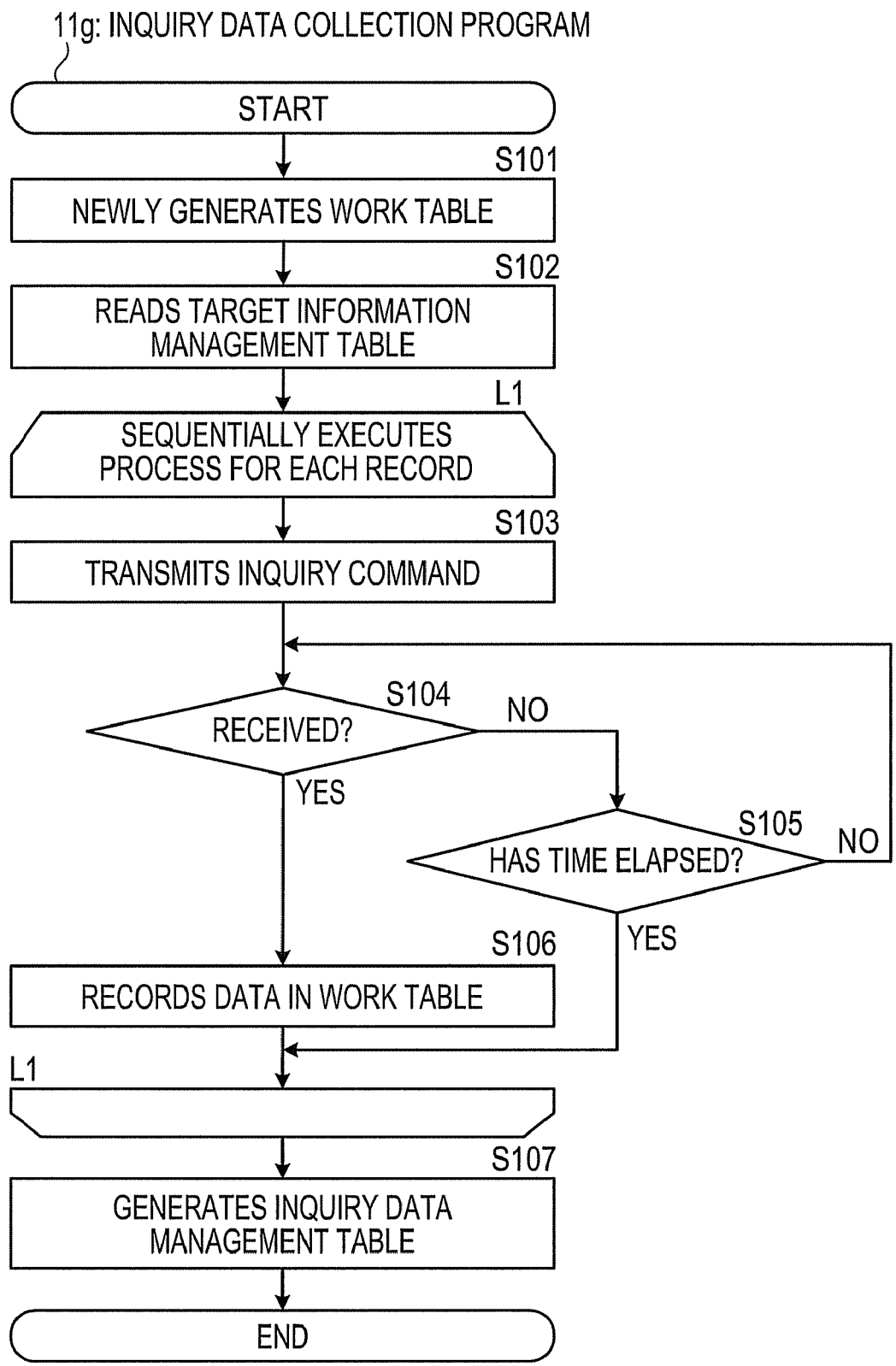
FIG. 6 is a diagram depicting the flow of an inquiry data collection process.

FIG. 6 is a diagram depicting the flow of the inquiry data collection process in the SCSI adapter unit 11. After start of the inquiry data collection process, the CPU 11d generates a new work table in the RAM unit 11e at S101. The work table generated here has the same field configuration as that of the inquiry data management table 11h. At S102, the CPU 11d reads the target information management table 11f from the ROM unit 11c. After that, the CPU 11d executes a first processing loop L1. In the first processing loop L1, the CPU 11d sequentially identifies each of all the records in the target information management table 11f read at S102, and executes the process from S103 to S106 for the identified records.

At S103, the CPU 11d transmits an inquiry command including a target ID and a LUN included in a processing target record. FIG. 7 is a diagram of the format of the inquiry command. The inquiry command is well known. When receiving the inquiry command, the SCSI device 12 gives its own inquiry data 12d as a response in accordance with the inquiry data notification program 12e. The process by this inquiry data notification program 12e is well known.

At S104, the CPU 11d determines whether the response to the inquiry command transmitted at S103 has been received. If the response to the inquiry command transmitted at S103 has not been received, at step S104 the CPU 11d branches the process to S105.

At S105, the CPU 11d determines whether or not a predetermined period of time has elapsed after the inquiry command was transmitted at S103. If the predetermined period of time has not elapsed after the inquiry command was transmitted at S103, the CPU 11d branches the process at step S105 and returns the process to S104.

If the predetermined period of time has elapsed after transmission of the inquiry command at S103 while the CPU 11d is repeatedly executing S104 and S105, the CPU 11d advances the process from S105 and ends the process for this processing target record in the first processing loop L1.

If receiving a response to the inquiry command transmitted at S103 before elapse of the predetermined period of time while repeatedly executing S104 and S105, the CPU 11d advances the process from S104 to step S106. At S106, the CPU 11d performs a process for recording the inquiry data 12d received at S104 into the work table in the RAM unit 11e. After that, the CPU 11d ends the process for this processing target record in the first processing loop L1.

When finishing execution of the process from S103 to S106 for all the records in the target information management table 11f read at S102, the CPU 11d exits the first processing loop L1 and advances the process to S107. At S107, the CPU 11d reproduces the work table in the RAM unit 11e and records the work table reproduced in the RAM unit 11e as an inquiry data management table 11h. After recording the inquiry data management table 11h, the CPU 11d ends the inquiry data collection process according to FIG. 6.

According to this inquiry data collection process, the SCSI adaptor unit 11 performs the inquiry process immediately after it is activated even if there is not a request from the BIOS software 10e in the boot memory unit 10b and/or the file system software 10h in the OS software 10g. The SCSI adaptor unit 11 also collects the inquiry data 12d from the SCSI devices 12 connected thereto.

Figure 8:
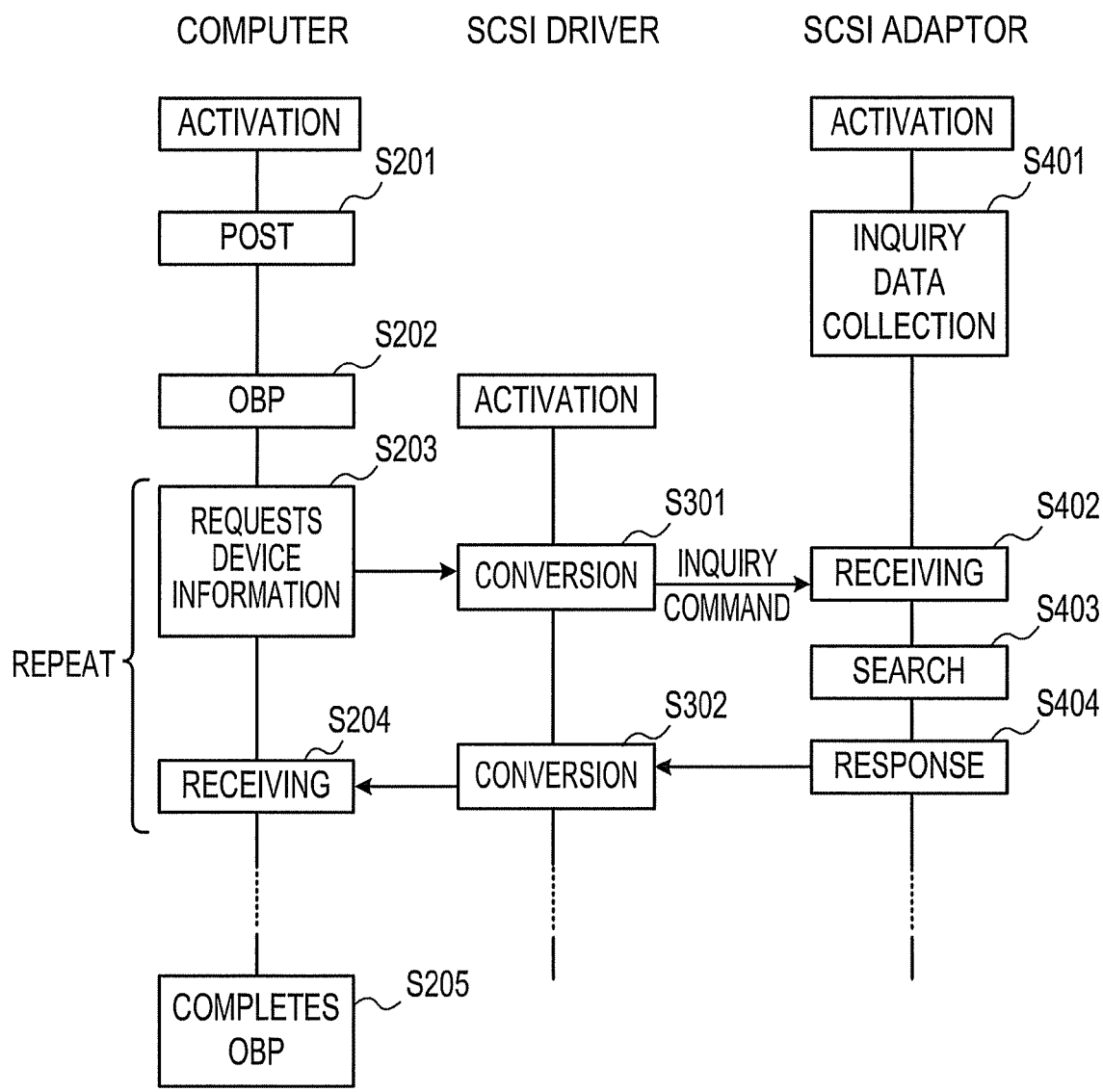
FIG. 8 is a diagram of a sequence performed at the time of activation of a computer system according to the first embodiment.

FIG. 8 is a diagram depicting the sequence at the time of activation, among the computer 10, the SCSI driver 10i and the SCSI adaptor unit 11 of the first embodiment. In the computer system of the first embodiment, when the main power supply of the computer 10 is turned on, the BIOS software 10e in the boot memory unit 10b is activated by the CPU 10c, and a POST (Power-On Self Test) included in the BIOS software 10e is started (S201). Next, the inquiry data collection program 11g in the SCSI adaptor unit 11 is activated by the CPU 11d, and the inquiry data collection process is executed (S401). The inquiry data collection process is executed in the multiple SCSI adaptor units 11 in parallel. Then, the inquiry data management table 11h is generated in the RAM unit 11e of each SCSI adaptor unit 11 as described before with reference to FIG. 6.

In the computer 10, when it is confirmed by execution of the POST that there is no problem in each unit, an OBP (Open Boot Program) included in the BIOS software 10e is then started (S202). In order to recognize the SCSI devices 12 connected to the SCSI adaptor units 11, the OBP includes a program for acquiring device information about each of the SCSI devices 12. The CPU 10c in accordance with the program of the OBP, requests device information about any one of the SCSI devices 12 from the SCSI adaptor unit 11 via the SCSI driver 10i (S203).

Then, the CPU 10c in accordance with the SCSI driver 10i converts the request for device information to an inquiry command and transmits the converted request to the SCSI adaptor unit 11 to which the specified SCSI device 12 is connected (S301). When receiving the inquiry command (S402), the SCSI adaptor unit 11 searches the inquiry data management table 11h in the RAM unit 11e, with the target ID and LUN specified by the inquiry command as the search conditions (S403). After that, if the SCSI adaptor unit 11 can detect inquiry data 12d, it gives the inquiry data 12d to the OBP via the SCSI driver 10i as a response at S404. If the SCSI adaptor unit 11 cannot detect the inquiry data 12d, it gives information to that effect to the OBP via the SCSI driver 10i as a response (S404). S402 to S404 are processes performed by the response program 11i.

Then, the CPU 10c in accordance with the SCSI driver 10i converts the response from the SCSI adaptor unit 11 into a format which can be read by the OBP, and hands the converted response over to the OBP as device information (S302). Next, the CPU 10c in accordance with the OBP receives the device information and records it into a kernel not depicted (S204).

The CPU 10c in accordance with the OBP repeatedly executes a process including request for device information (S203) and receiving of the device information (S204) for all the SCSI devices 12 connected to the computer 10. Then, when finishing the execution for all the SCSI devices 12 (S205), the CPU 10c starts activation of the OS software 10g.

Figure 9:
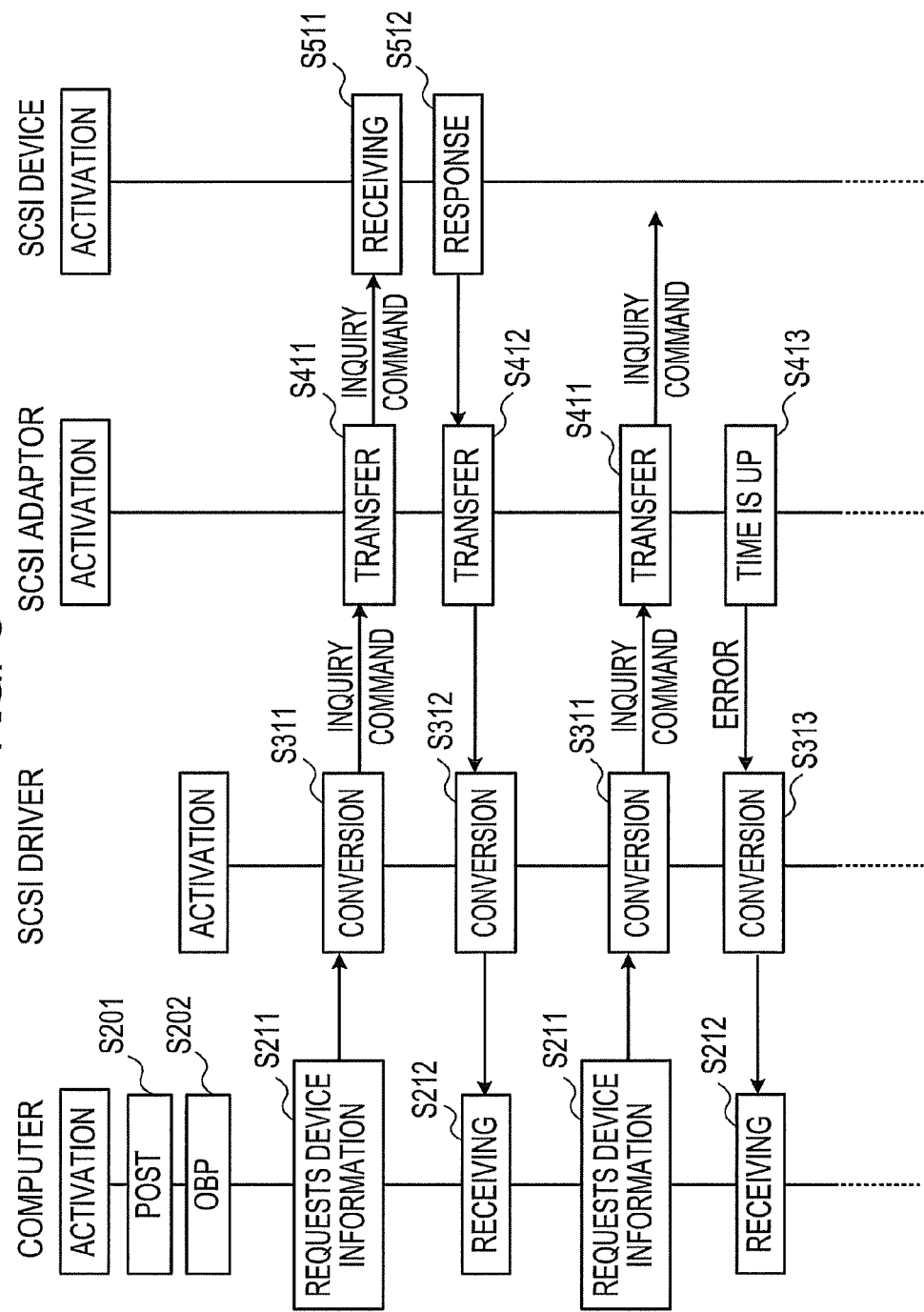
FIG. 9 is a diagram depicting a sequence performed at the time of activation in other computer system.

FIG. 9 is a diagram depicting a sequence at the time of activation in other computer system. Apparent from comparison between FIG. 9 and FIG. 8, in the other computer system, the inquiry data collection process (S401) is not performed in the SCSI adaptor unit 11 even if the POST is started. In the other computer system, when the POST is completed and the OBP is started (S202), the CPU 10c requests device information about any one of the SCSI devices 12 from the SCSI adaptor unit 11 via the SCSI driver 10i (S211). Receiving this request, the CPU 10c in accordance with the SCSI driver 10i converts the request to an inquiry command (S311), and the SCSI adaptor unit 11 to which the specified SCSI device 12 is connected transmits the inquiry command to the SCSI device 12 (S411).

In the other computer system, when the SCSI device 12 is normally operating, it receives the inquiry command and gives its own inquiry data 12d to the OBP as a response (S511, S512, S412, S312 and S212). However, when the SCSI device 12 is not normally operating, a response is not returned from the SCSI device 12 even if the SCSI adaptor unit 11 transmits the inquiry command. In such a case, the SCSI adaptor unit 11 waits for a predetermined period of time until a response is returned from the SCSI devices 12. When the time is up (S413), the SCSI adaptor unit 11 returns an error to the OBP as a response (S413).

In the other computer system also, similarly to the first embodiment, the CPU 10c in accordance with the OBP repeatedly executes a process including request for device information (S211) and receiving of the device information (S212) for all the SCSI devices 12 connected to the computer 10. Therefore, in the other computer system, the time spent to wait because a response is not returned from a SCSI device 12 is accumulated, for the number of SCSI devices 12 which are not normally operating, and included into the execution time of the OBP. However, according to the computer system of the first embodiment, the SCSI adaptor unit 11 collects the inquiry data 12d from the SCSI devices 12 while (e.g., during or in parallel or simultaneously or concurrently) the POST is being executed. Therefore, even if waiting time occurs several times because there exist such SCSI devices 12 as are not normally operating, the waiting time is not included in the execution time of the OBP.

Furthermore, according to the first embodiment, the inquiry data collection process is executed in the multiple SCSI adaptor units 11 in parallel. Therefore, even if waiting time occurs in the inquiry data collection process in each SCSI adaptor unit 11, the waiting time is not accumulated.

Thus, according to the computer system of the first embodiment, the time needed until activation of the OS software 10g is started after the main power supply of the computer 10 is turned on is less than that of the other computer system.

Description has been made on the process of the OBP acquiring a request for device information according to the first embodiment. However, similar advantages can be also obtained even in the case where (the CPU 10c in accordance with) the file system software 10h of the OS software 10g acquires device information from each SCSI device 12 according to another aspect of the first embodiment. That is, in the case where the CPU 10c in accordance with the file system software 10h requests device information about each SCSI device 12 from the SCSI adaptor unit 11, information whether the inquiry data 12d of the specified SCSI device 12 exists or not is immediately given from the SCSI adaptor unit 11 as a response. Therefore, the CPU 10c in accordance with the file system software 10h does not have to wait for a predetermined period of time together with the SCSI adaptor unit 11 because a response is not returned from a SCSI device 12 which is not normally operating.

Second Embodiment

A second embodiment is different from the first embodiment in that a computer and RAID devices are connected not via SCSI buses but via FC (Fibre Channel) switches.

Figure 10:
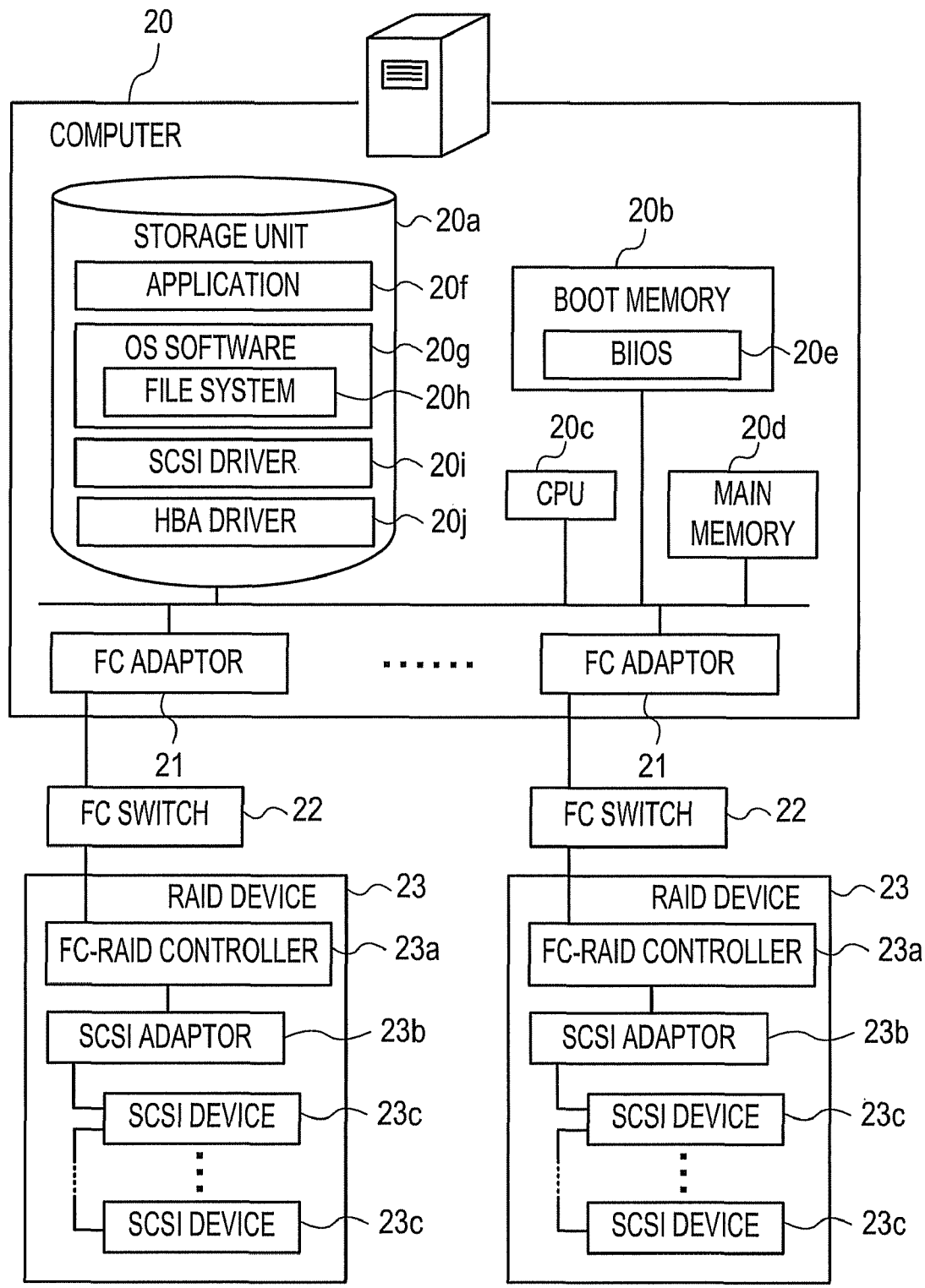
FIG. 10 is a block diagram of a computer system of a second embodiment.

FIG. 10 is a block diagram of a computer system of the second embodiment. As depicted in FIG. 10, the computer system of the second embodiment includes a computer 20 and multiple RAID (Redundant Arrays of Independent Disks) devices 23 connected to the computer 20 via FC switches 22.

Among these, the computer 20 is provided with a storage unit 20a, a boot memory unit 20b, a CPU 20c, a main memory unit 20d, and FC adaptor units 21. Except for the FC adaptor units 21, the units 20a to 20d show functions similar to the functions of the same units 10a to 10d in the computer 10 of the first embodiment, respectively. On the other hand, the FC adaptor unit 21 is a unit which adds an interface for connecting the RAID device 23 which is an FC device, to the computer as an expanded function, and it is a so-called host bus adaptor.

Similarly to the computer 10 of the first embodiment, the computer 20 stores BIOS software 20e in the boot memory unit 20b. Furthermore, the computer 20 stores an application 20f and OS software 20g in the storage unit 20a. The OS software 20g includes file system software 20h.

In the second embodiment, the computer 20 stores a SCSI driver 20i and an HBA (Host Bus Adaptor) driver 20j in the storage unit 20a. The SCSI driver 20i is a program which controls SCSI communication between the BIOS software 20e and/or the OS software 20g and SCSI devices. The HBA driver 20j is a program which converts data transmitted by the SCSI driver 20i into a communication form for FC communication and hands the converted data over to the FC adaptor unit 21, or converts data received by the FC adaptor unit 21 via FC communication to data which can be interpreted by the SCSI driver 20i.

The FC switch 22 is a network device which mediates a packet.

The RAID device 23 is an external storage device of the computer 20. This RAID device 23 includes an FC-RAID controller 23a, a SCSI adaptor 23b and multiple SCSI devices 23c. The FC-RAID controller 23a is provided with an interface for FC communication and a function of managing disk media in the multiple SCSI devices 23c as virtually one disk medium. The SCSI adaptor 23b is a controller which controls the SCSI devices 23c connected thereto. Similarly to the SCSI device depicted in FIG. 2, the SCSI device 23c is provided with an I/F unit, a disk unit and a disk controller. The disk controller includes a ROM, a CPU and a RAM, and software for performing communication in accordance with the SCSI standard and inquiry data are recorded in the ROM.

Figure 11:
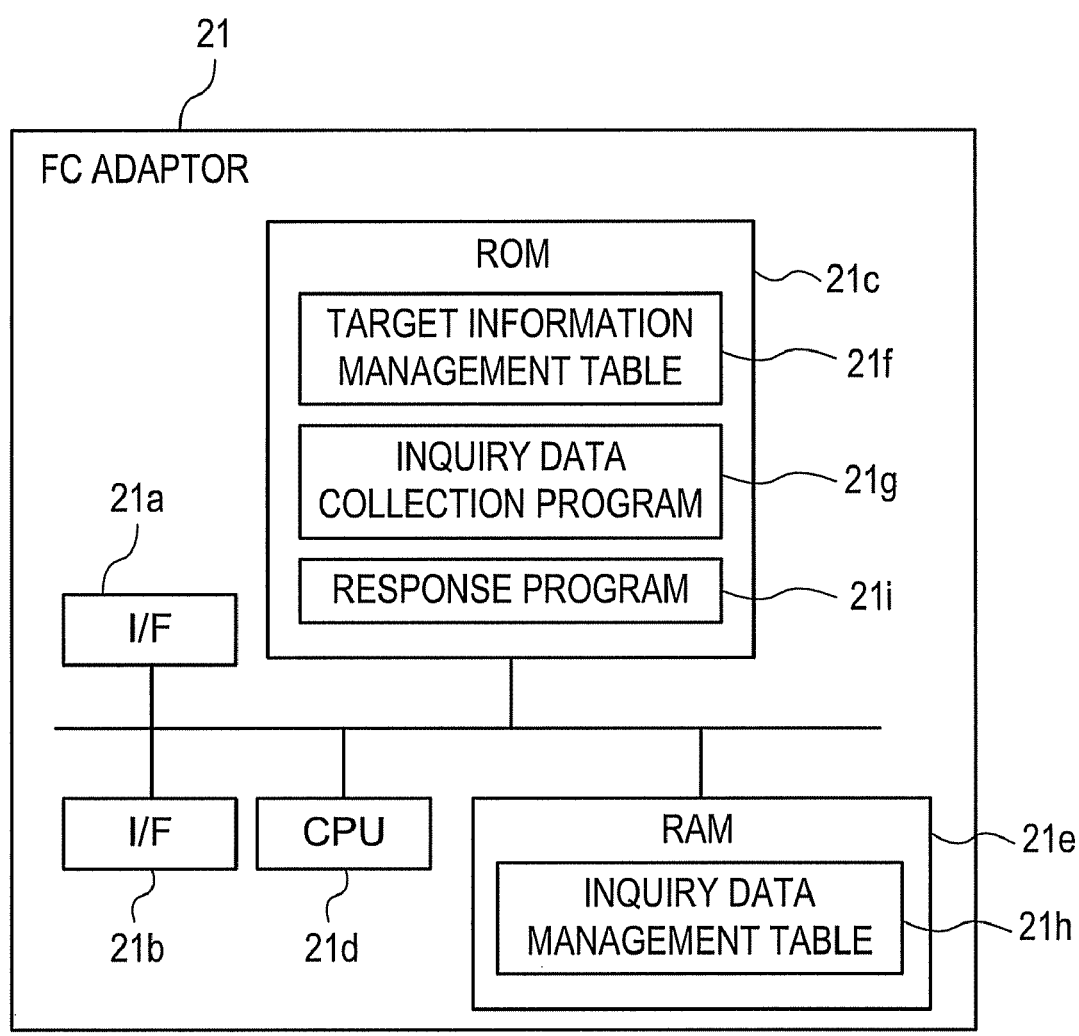
FIG. 11 is a block diagram of an FC adaptor unit.

FIG. 11 is a block diagram of the FC adaptor unit 21. As depicted in FIG. 11, the FC adaptor unit 21 is provided with I/F units 21a and 21b, a ROM unit 21c, a CPU 21d, and a RAM unit 21e. The first I/F unit 21a is a unit which exchanges data with units in the computer 20, such as the CPU 20c. The second I/F unit 21b is a unit which performs communication in accordance with the FC standard. The RAID device 23, which is an FC device, is connected to this I/F unit 21b. The ROM unit 21c is a unit in which programs and data are recorded. The CPU 21d is a unit which performs processing in accordance with the programs in the ROM unit 21c. The RAM unit 21e is a unit where the CPU 21d caches a program or data or develops a work area.

The FC adaptor unit 21 stores software for performing communication in accordance with the FC standard, software for performing communication in accordance with the SCSI standard, and software similar to the HBA driver described before, in the ROM unit 21c. The software for performing communication in accordance with the SCSI standard is set as an initiator in the second embodiment. Furthermore, a target information management table 21f, an inquiry data collection program 21g and a response program 21l are added to this software. The target information management table 21f is similar to the target information management table of the first embodiment (FIG. 5), and the inquiry data collection program 21g and the response program 21l are also similar to the inquiry data collection program and the response program of the first embodiment (FIGS. 6 and 8).

The software which the FC adaptor units 21 store in the ROM unit 21c is firmware which is fixedly recorded in the ROM unit 21c.

<Advantages>

Since the computer system of the second embodiment has the form as described above, the second system performs the operation similar to that of the SCSI adaptor unit 11 of the first embodiment. That is, after the computer 20 is activated, the FC adaptor unit 21 collects inquiry data from the SCSI devices 23c in the RAID device 23 while the POST in the BIOS software 20e is being executed. Therefore, even if waiting time occurs several times because there exist such SCSI devices 23c that are not normally operating, the waiting time is not included into the execution time of the OBP.

Furthermore, in the second embodiment also, the inquiry data collection process is executed in the multiple FC adaptor units 21 in parallel. Therefore, even if waiting time occurs in the inquiry data collection process in each FC adaptor unit 21, the waiting time is not accumulated.

Thus, according to the computer system of the second embodiment also, the time required until activation of the OS software 20g is started after the main power supply of the computer 20 is turned on is less than that of the other computer system of FIG. 9.

Third Embodiment

A third embodiment is different from the first embodiment in that a computer and RAID devices are connected via SASs (Serial Attached SCSIs).

Figure 12:
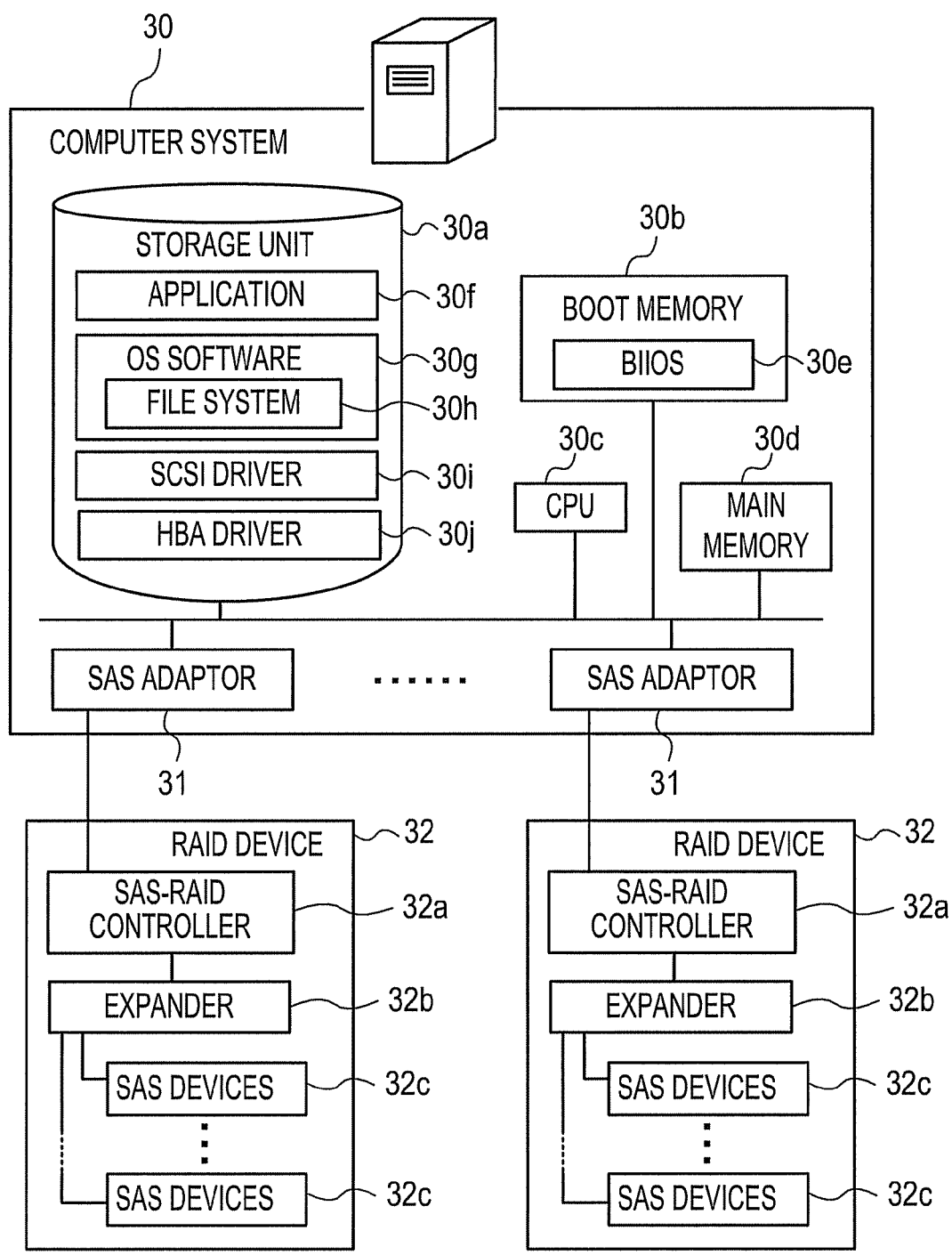
FIG. 12 is a block diagram of a computer system of a third embodiment.

FIG. 12 is a block diagram of a computer system of the third embodiment. As depicted in FIG. 12, the computer system of the third embodiment includes a computer 30 and multiple RAID (Redundant Arrays of Independent Disks) devices 32 connected to the computer 30.

Among these, the computer 30 is provided with a storage unit 30a, a boot memory unit 30b, a CPU 30c, a main memory unit 30d, and SAS adaptor units 31. Except for the SAS adaptor units 31, the units 30a to 30d show functions similar to the functions of the same units 10a to 10d in the computer 10 of the first embodiment, respectively. On the other hand, the SAS adaptor unit 31 is a unit which adds an interface for connecting a RAID device 32 which is an FC device, to the computer as an expanded function, and it is a so-called host bus adaptor.

Similarly to the computer 10 of the first embodiment, the computer 30 stores BIOS software 30e in the boot memory unit 30b. Furthermore, the computer 30 stores an application 30f and OS software 30g in the storage unit 30a. The OS software 30g includes file system software 30h.

In the third embodiment, the computer 30 stores a SCSI driver 30i and an HBA driver 30j in the storage unit 30a. The SCSI driver 30i is a program which controls SCSI communication between the BIOS software 30e or the OS software 30g and SCSI devices. The HBA driver 30j is a program which converts data transmitted by the SCSI driver 30i into a communication form for SAS communication and hands it over to the SAS adaptor unit 31, or converts data received by the SAS adaptor unit 31 via SAS communication to data which can be interpreted by the SCSI driver 30i.

The RAID device 32 is an external storage device of the computer 30. This RAID device 32 includes an SAS-RAID controller 32a, an expander 32b and multiple SAS devices 32c. The SAS-RAID controller 32a is provided with an interface for SAS communication and a function of managing disk media in the multiple SAS devices 32c as virtually one disk medium. The expander 32b is a relay device which expands a connection topology. Similarly to what is depicted in FIG. 2, the SAS device 32c is provided with an I/F unit, a disk unit and a disk controller. The disk controller includes a ROM, a CPU and a RAM, and software for performing communication in accordance with the SAS standard and inquiry data are recorded in the ROM. The software for performing communication in accordance with the SAS standard includes software for interpreting and executing a SCSI command.

Figure 13:
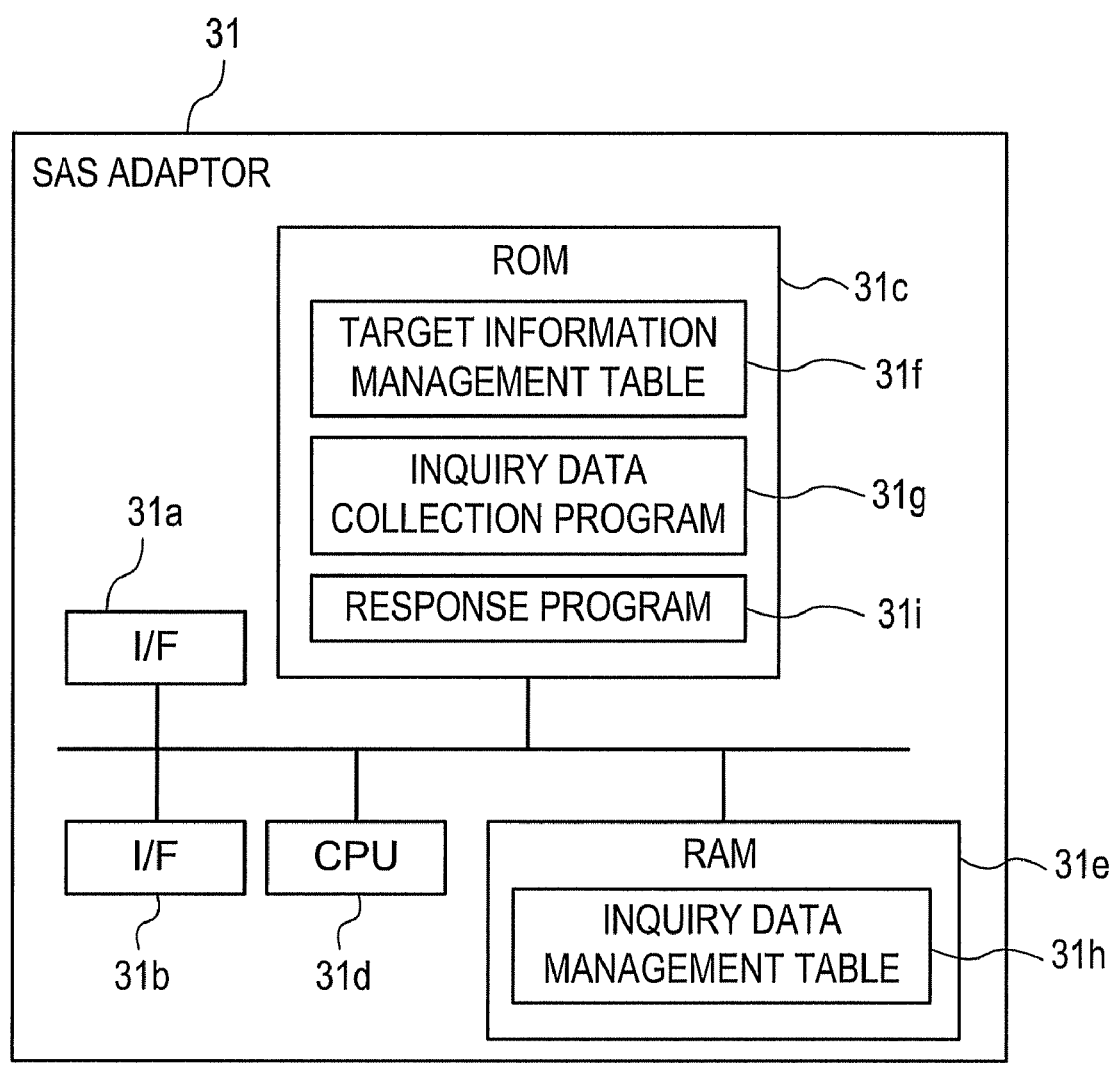
FIG. 13 is a block diagram of an SAS adaptor unit.

FIG. 13 is a block diagram of the SAS adaptor unit 31. As depicted in FIG. 13, the SAS adaptor unit 31 is provided with I/F units 31a and 31b, a ROM unit 31c, a CPU 31d, and a RAM unit 31e. The first I/F unit 31a is a unit which exchanges data with units in the computer 30, such as the CPU 30c. The second I/F unit 31b is a unit which performs communication in accordance with the SAS standard. The RAID device 32, which is an SAS device, is connected to this I/F unit 31b. The ROM unit 31c is a unit in which programs and data are recorded. The CPU 31d is a unit which performs processing in accordance with the programs in the ROM unit 31c. The RAM unit 31e is a unit where the CPU 31d caches a program or data or develops a work area.

The SAS adaptor unit 31 stores software for performing communication in accordance with the SAS standard, in the ROM unit 31c. This software is set as an initiator in the third embodiment. Furthermore, this software includes a target information management table 31f, an inquiry data collection program 31g and a response program 31i. The target information management table 31f is similar to the target information management table of the first embodiment (FIG. 5), and the inquiry data collection program 31g and the response program 31i are also similar to the inquiry data collection program and the response program of the first embodiment (FIGS. 6 and 8).

The software which the SAS adaptor units 31 stores in the ROM unit 31c is firmware which is fixedly recorded in the ROM unit 31c.

Since the computer system of the third embodiment has the form as described above, it performs the operation similar to that of the SCSI adaptor unit 11 of the first embodiment. That is, after the computer 30 is activated, the SAS adaptor units 31 collects inquiry data from the SAS devices 32c in the RAID device 32 while the POST in the BIOS software 30e is being executed. Therefore, even if waiting time occurs several times because there exist such SAS devices 32c as are not normally operating, the waiting time is not included into the execution time of the OBP.

Furthermore, in the third embodiment also, the inquiry data collection process is executed in the multiple SAS adaptor units 31 in parallel. Therefore, even if waiting time occurs in the inquiry data collection process in each SAS adaptor unit 31, the waiting time is not accumulated.

Thus, according to the computer system of the third embodiment also, the time needed until activation of the OS software 30g is started after the main power supply of the computer 30 is turned on is less than that of the other computer system of FIG. 9.

Fourth Embodiment

The first to third embodiments are in the form in which the inquiry data collection function and the response function are added to a host bus adaptor (the SCSI adaptor unit 11, the FC adaptor unit 21 and the SAS adaptor unit 31) without making any change in target devices (the SCSI devices 12, the SCSI devices 23c and the SAS devices 32c). On the other hand, a fourth embodiment is in the form in which, in a computer system configured by a computer and multiple SCSI devices, a unique sequence is added for communication between the initiator (SCSI adaptor) and the target devices (SCSI devices). Therefore, the computer system of the fourth embodiment has the same system configuration as that of the computer system depicted in FIG. 1.

Figure 14:
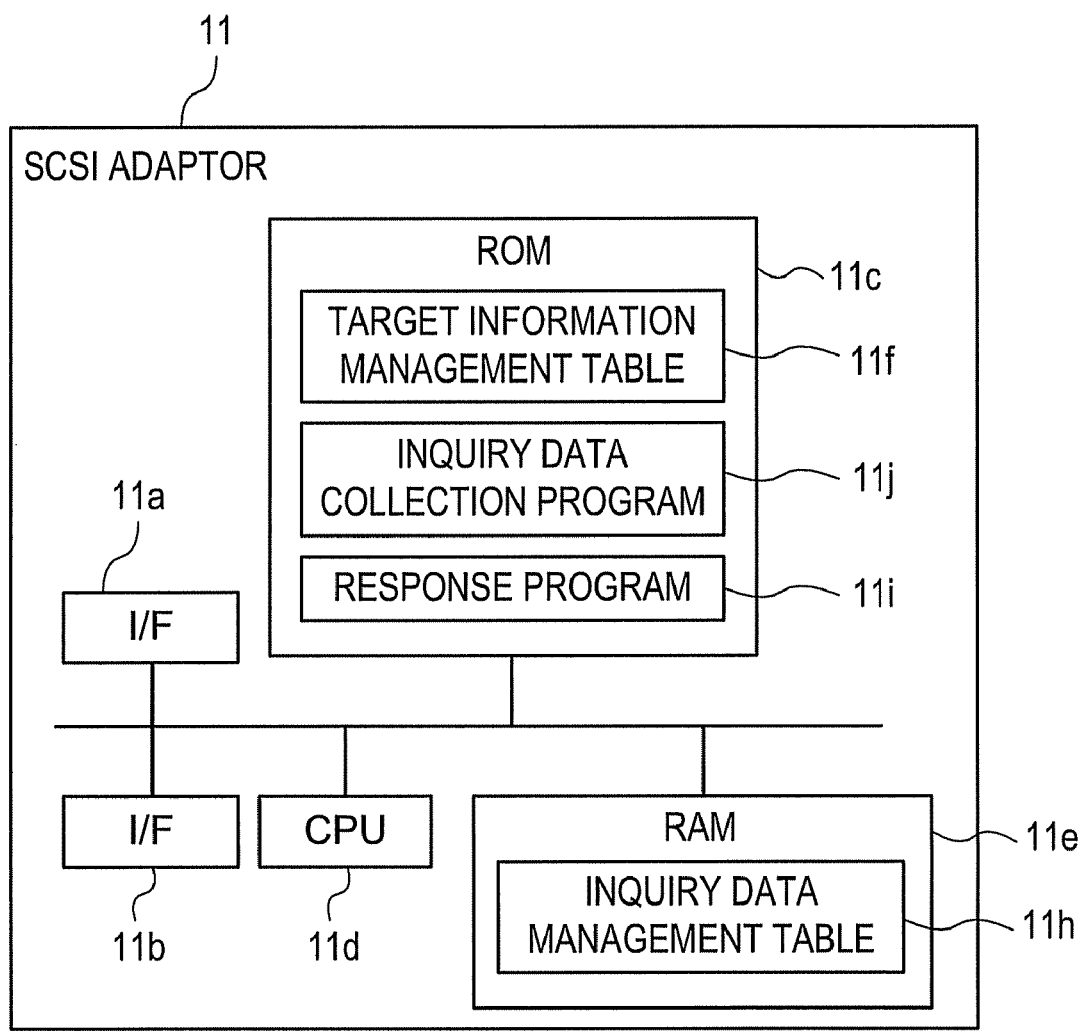
FIG. 14 is a block diagram of a SCSI adaptor unit in a fourth embodiment.

FIG. 14 is a block diagram of a SCSI adaptor unit 11 in the fourth embodiment. Apparent from FIGS. 14 and 4, the SCSI adaptor unit 11 of the fourth embodiment has similar hardware configuration as the SCSI adaptor unit of the first embodiment. Furthermore, similar to the first embodiment, the SCSI adaptor unit 11 of the fourth embodiment stores a target information management table 11f, an inquiry data collection program 11j and a response program 11i in a ROM unit 11c. However, the contents of the process by the inquiry data collection program 11j of the fourth embodiment are different from the contents of the process by the inquiry data collection program 11g of the first embodiment (FIG. 6) as described later.

Figure 15:
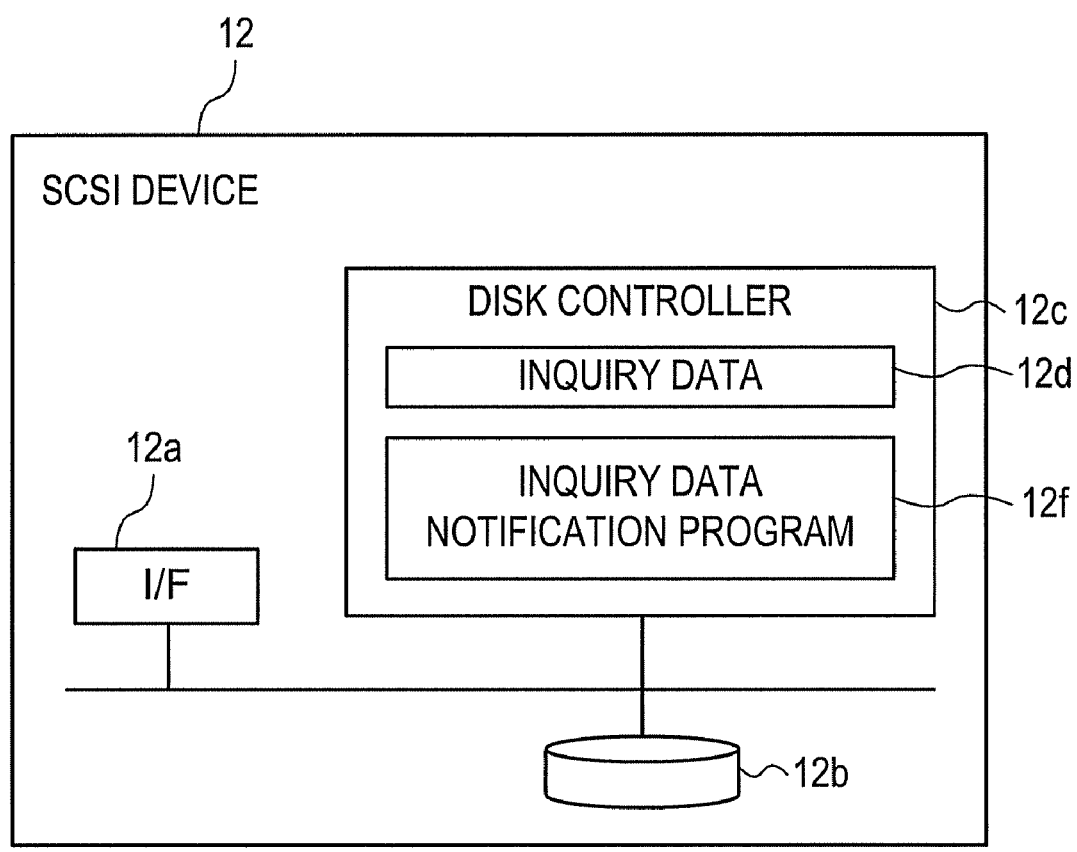
FIG. 15 is a block diagram of a SCSI device in the fourth embodiment.

FIG. 15 is a block diagram of a SCSI device 12 in the fourth embodiment. Apparent from FIGS. 15 and 2, the SCSI device 12 of the fourth embodiment has similar hardware configuration as the SCSI device of the first embodiment. Furthermore, similar to the first embodiment, the SCSI device 12 of the fourth embodiment stores inquiry data 12d and an inquiry data notification program 12f in a disk controller 12c. However, the contents of the process by the inquiry data notification program 12f of the fourth embodiment is different from the contents of the process by the inquiry data notification program 12e of the first embodiment as described later.

In the SCSI adaptor unit 11, the inquiry data collection program 11j is automatically activated by a CPU 11d when the power supply of the SCSI adaptor unit 11 is turned on. When this inquiry data collection program 11j is activated, the inquiry data collection process is started by the CPU 11d.

Figure 16:
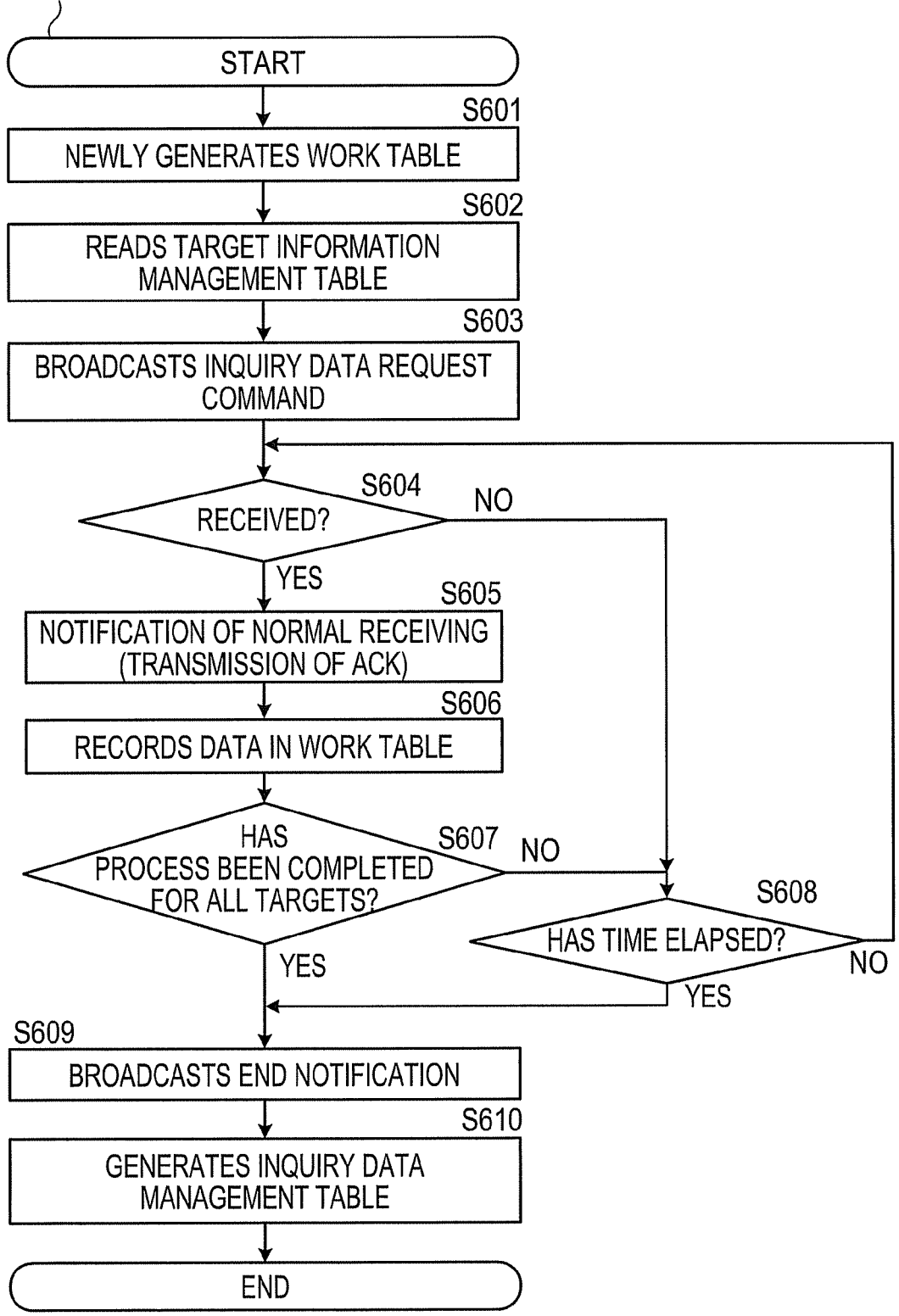
FIG. 16 is a diagram depicting the flow of an inquiry data collection process.

FIG. 16 is a diagram depicting the flow of the inquiry data collection process. After the inquiry data collection process is started, the CPU 11d generates a new work table in the RAM unit 11e at S601. The work table generated here has the same field configuration as that of an inquiry data management table 11h. At S602, the CPU 11d reads the target information management table 11f from the ROM unit 11c. The process performed so far is similar to that of the first embodiment.

At S603, the CPU 11d performs a process for broadcasting an inquiry data request command to all the targets related to all the records in the target information management table 11f read at S602. The command in the broadcast process is a newly prepared command separately from well-known SCSI commands. Therefore, a function of processing this command and giving a response is added to the SCSI devices 12 which receive this command. After broadcasting the inquiry data request command, the CPU 11d advances the process to step S604.

At S604, the CPU 11d determines whether or not inquiry data 12d has been received from any SCSI device 12. If inquiry data 12d has not been received from any SCSI device 12, the CPU 11d at 604 branches the process to S608. If inquiry data 12d has been received from any SCSI device 12, the CPU 11d advances the process to S605. At S605, the CPU 11d gives a notification of normal receiving (transmits ACK (Acknowledgement)) to the transmission source of the inquiry data 12d received at S604. At S606, the CPU 11d performs a process for recording the inquiry data 12d received at S604 in the work table in the RAM unit 11e. At S607, the CPU 11d determines whether the process for recording the inquiry data 12d has been completed, for all the targets related to all the records in the target information management table 11f read at S602. Then, if the process for recording the inquiry data 12d has been completed for all the targets, the CPU 11d advances the process to S609. On the other hand, if the process for recording the inquiry data 12d has not been completed for all the targets, the CPU 11d at 607 branches the process to S608.

At S608, the CPU 11d determines whether a predetermined period of time has elapsed after the inquiry data request command was broadcast at S603. Then, if the predetermined period of time has not elapsed after the inquiry data request command was broadcast, the CPU 11d branches the process at S608 and returns the process to S604. On the other hand, if the predetermined period of time has elapsed after the inquiry data request command was broadcast at S603, the CPU 11d advances the process to S609.

At S609, the CPU 11d performs a process for broadcasting an end notification to all the targets related to all the records in the target information management table 11f read at S602. The notification by the broadcast process is also a new process which is not included in the well-known SCSI standard.

At S610, the CPU 11d reproduces the work table in the RAM unit 11e and records the work table reproduced in the RAM unit 11e as the inquiry data management table 11h. After recording the work table, the CPU 11d ends the inquiry data collection process according to FIG. 16.

On the other hand, in the SCSI device 12, when the inquiry data request command is sent by the broadcast from the SCSI adaptor unit 11 which is an initiator, the inquiry data notification program 12f is activated by the disk controller 12c in response thereto, and the inquiry data notification process is started.

Figure 17:
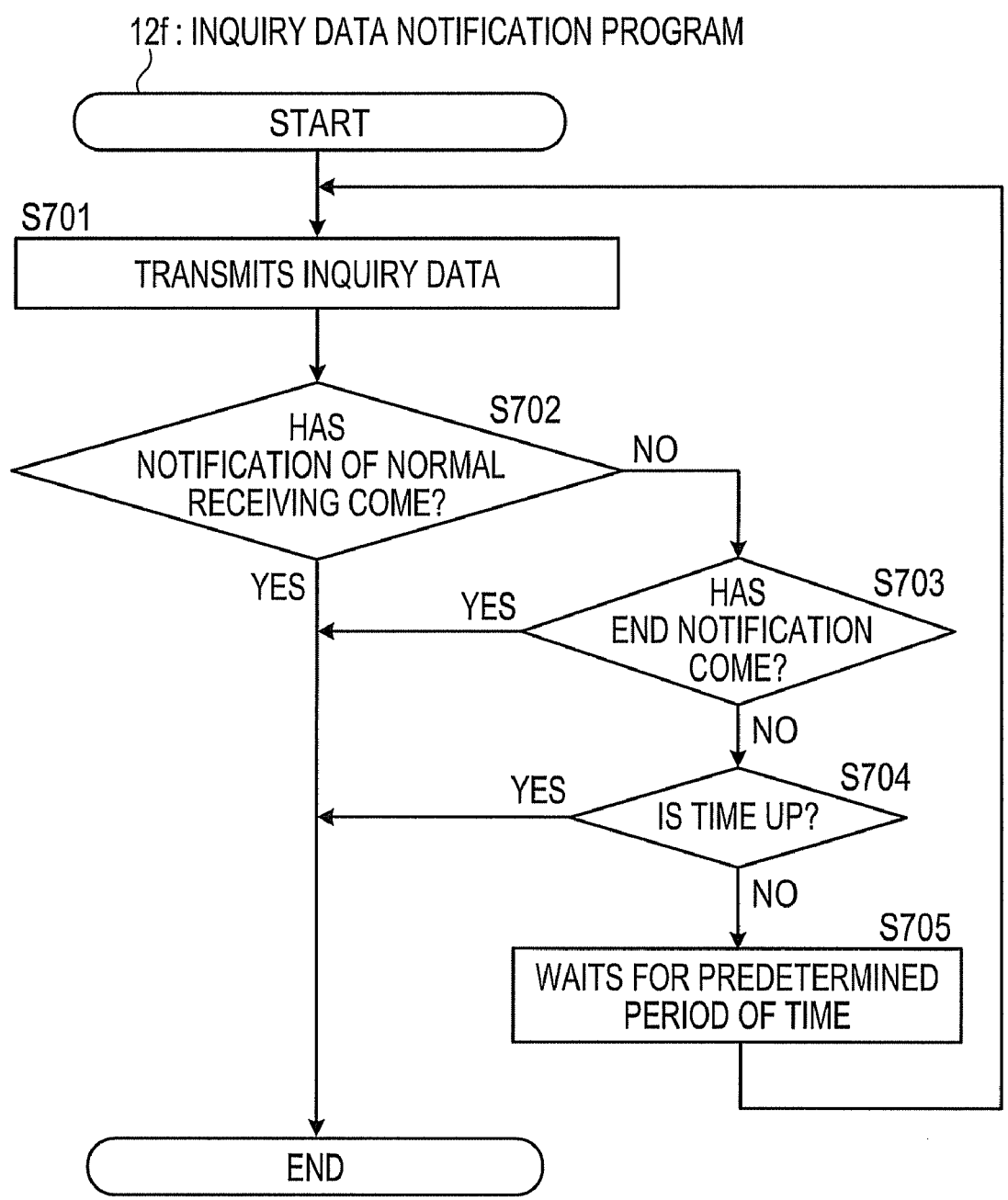
FIG. 17 is a diagram depicting the flow of an inquiry data notification process.

FIG. 17 is a diagram depicting the flow of the inquiry data notification process. After the inquiry data notification process is started, (the CPU in) the disk controller 12c performs a process for transmitting the inquiry data 12d to the transmission source of the inquiry data request command, at S701.

At S702, the disk controller 12c determines whether a notification of normal receiving has been received from the SCSI adaptor unit 11 which is an initiator. If the notification of normal receiving has been received from the SCSI adaptor unit 11 which is an initiator, the disk controller 12c ends the inquiry data notification process according to FIG. 17. On the other hand, if the notification of normal receiving has not been received from the SCSI adaptor unit 11 which is an initiator, the disk controller 12c at S702 branches the process to S703.

At S703, the disk controller 12c determines whether or not an end notification has been received from the SCSI adaptor unit 11 which is an initiator. If the end notification has been received from the SCSI adaptor unit 11 which is an initiator, the disk controller 12c branches the process at S703 and ends the inquiry data notification process according to FIG. 17. On the other hand, if the end notification has not been received from the SCSI adaptor unit 11 which is an initiator, the disk controller 12c advances the process to S704.

At S704, the disk controller 12c determines whether a predetermined period of time has elapsed after the inquiry data notification process according to FIG. 17 was started. If the predetermined period of time has elapsed after the inquiry data notification process according to FIG. 17 was started, the disk controller 12c branches the process at S704 and ends the inquiry data notification process according to FIG. 17. On the other hand, if the predetermined period of time has not elapsed after the inquiry data notification process according to FIG. 17 was started, the disk controller 12c advances the process to S705. At S705, the disk controller 12c performs a process for waiting for a predetermined period of time. After that, the disk controller 12c returns the process to S701 and performs the process for transmitting the inquiry data 12d again.

According to the inquiry data collection process according to FIG. 16 and the inquiry data notification process according to FIG. 17, the SCSI adaptor unit 11 can not only collect the inquiry data 12d immediately after being activated but also simultaneously collect the inquiry data 12d from all the SCSI devices 12 connected to the SCSI adaptor unit 11. Here, the SCSI adaptor unit 11 can collect the inquiry data 12d even if a request is not given from the BIOS software 10e in the boot memory unit 10b and/or the file system software 10h in OS software 10g.

Fifth Embodiment

A fifth embodiment is different from the fourth embodiment in that a computer and SCSI devices are connected not via SCSI buses but via FC switches. That is, the fifth embodiment is in the form in which, in a computer system having the same hardware configuration as that of the second embodiment (FIG. 10), a unique sequence is added for communication between an FC adaptor unit 21 and SCSI devices 23c in a RAID device 23 for collection of inquiry data.

<Configuration>

Figure 18:
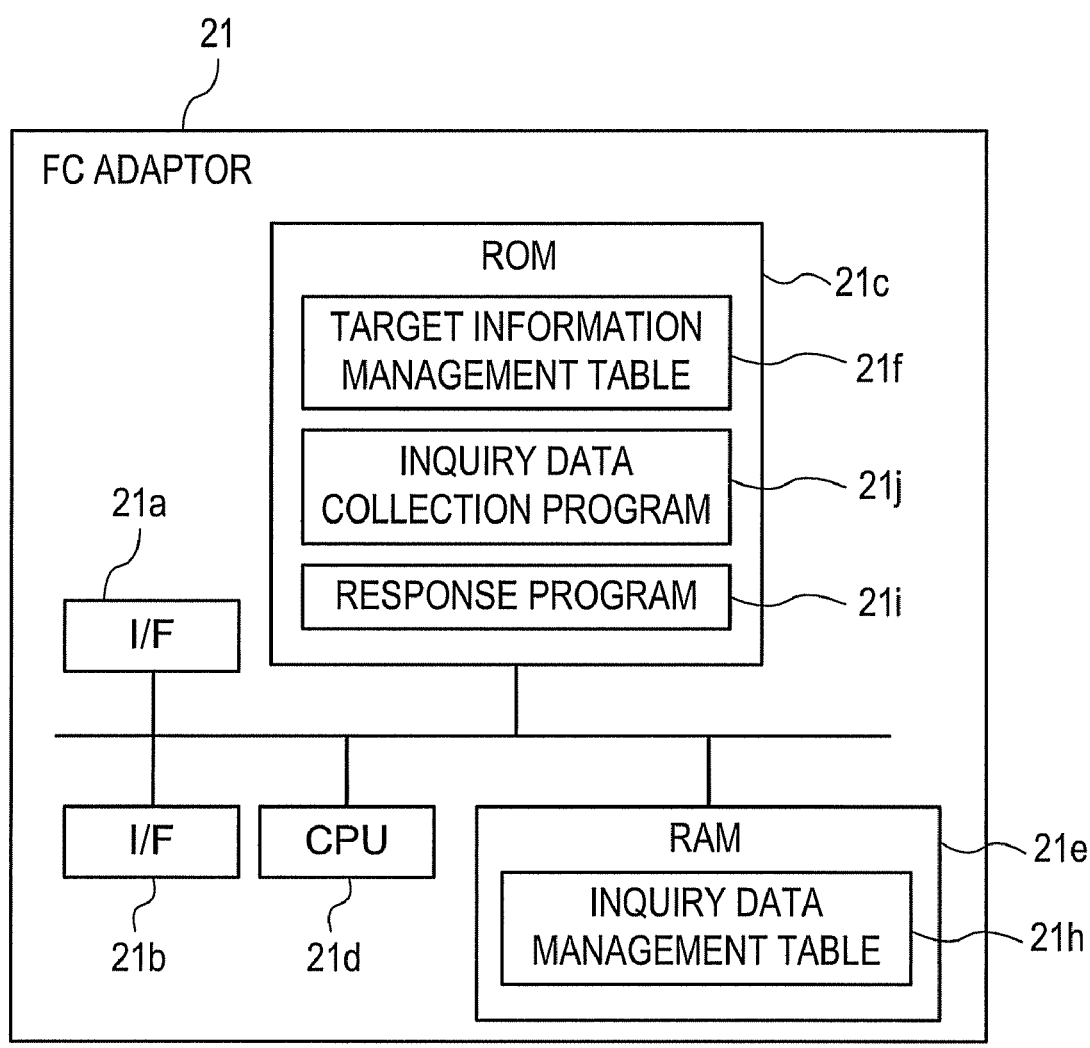
FIG. 18 is a block diagram of an FC adaptor unit in a fifth embodiment.

FIG. 18 is a block diagram of the FC adaptor unit 21 in the fifth embodiment. Apparent from FIGS. 18 and 11, the FC adaptor unit 21 of the fifth embodiment has similar hardware configuration as the FC adaptor unit of the second embodiment. Furthermore, similar to the second embodiment, the FC adaptor unit 21 of the fifth embodiment stores a target information management table 21f, an inquiry data collection program 21j and a response program 21i in a ROM unit 21c. Further, the contents of the process by the inquiry data collection program 21j of the fifth embodiment are similar to the contents of the process by the inquiry data collection program 11g of the first embodiment (FIG. 16).

The SCSI device 23c in the fifth embodiment has similar hardware configuration and software configuration as those of the SCSI device 12 depicted in FIG. 15. Further, in the SCSI device 23c, processing whose contents are similar as the contents of the process by the inquiry data notification program 12f of the fourth embodiment (FIG. 17) is executed.

Since the computer system of the fifth embodiment has the form described above, the FC adaptor unit 21 can not only collect inquiry data 12d immediately after being activated but also simultaneously collect the inquiry data 12d from all the SCSI devices 23c connected to the FC adaptor unit 21, by an inquiry data collection process similar to that in FIG. 16 and an inquiry data notification process similar to that in FIG. 17. Here, the FC adaptor unit 21 can collect the inquiry data even if a request is not given from BIOS software 20e in a boot memory unit 20b and/or file system software 20h in OS software 20g.

Sixth Embodiment

A sixth embodiment is different from the fourth embodiment in that a computer and RAID devices are connected via SASs. That is, the sixth embodiment is in the form in which, in a computer system having similar hardware configuration as that of the third embodiment (FIG. 12), a unique sequence is added for communication between an SAS adaptor unit 31 and SAS devices 32c in a RAID device 32 for collection of inquiry data.

Figure 19:
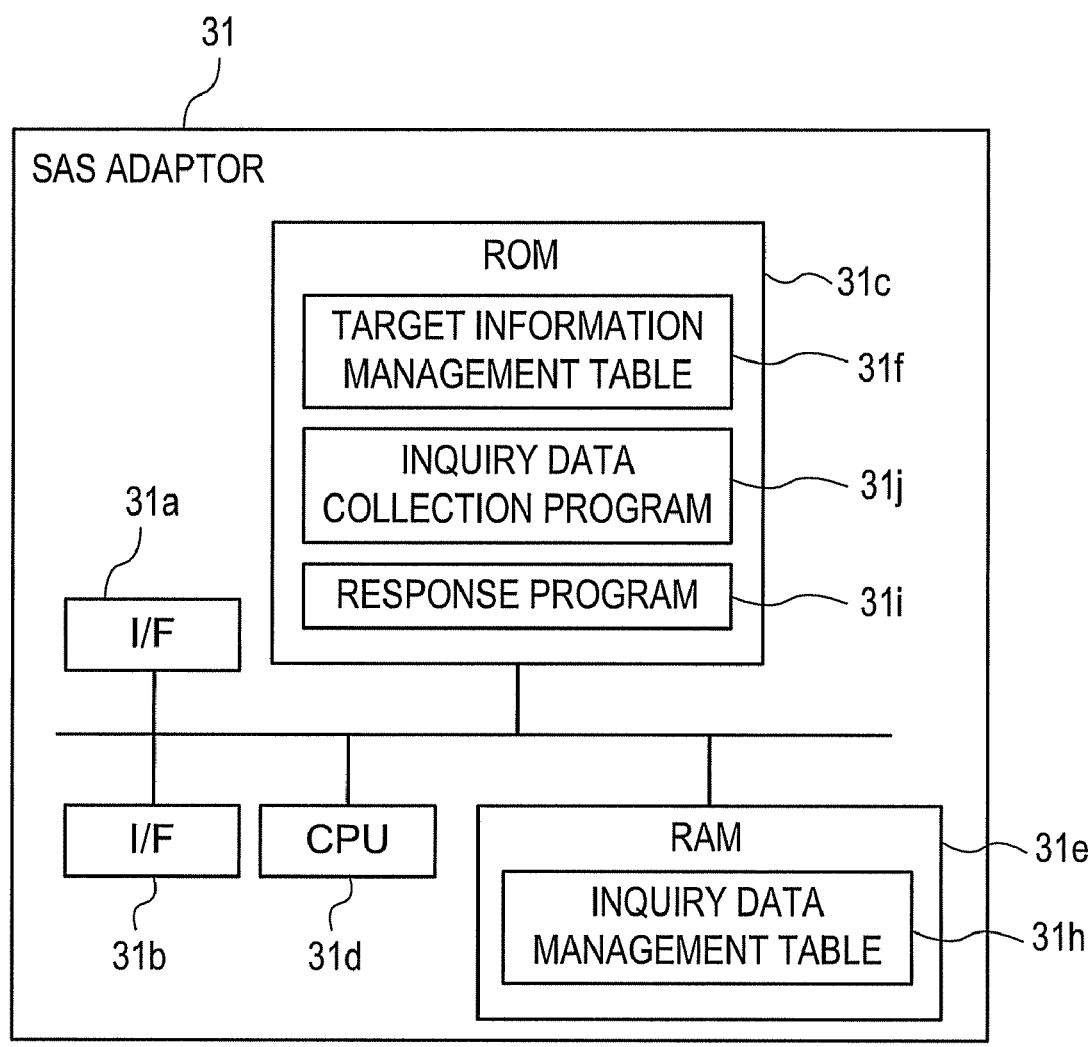
FIG. 19 is a block diagram of an SAS adaptor unit in a sixth embodiment.

FIG. 19 is a block diagram of the SAS adaptor unit 31 in the sixth embodiment. Apparent from FIGS. 19 and 13, the SAS adaptor unit 31 of the sixth embodiment has similar hardware configuration as the SAS adaptor unit of the third embodiment. Furthermore, similar to the third embodiment, the SAS adaptor unit 31 of the sixth embodiment stores a target information management table 31f, an inquiry data collection program 31j and a response program 31i in a ROM unit 31c. Further, the contents of the process by the inquiry data collection program 31j of the sixth embodiment are similar as the contents of the process by the inquiry data collection program 11g of the fourth embodiment (FIG. 16).

Similarly to what is depicted in FIG. 2, the SAS device 32c in the sixth embodiment is provided with an I/F unit, a disk unit and a disk controller. The disk controller includes a ROM, a CPU and a RAM, and software for performing communication in accordance with the SAS standard and inquiry data are recorded in the ROM. The software for performing communication in accordance with the SAS standard includes software for interpreting and executing a SCSI command and an inquiry data notification program for executing processing whose contents are similar as the contents of the process by the inquiry data notification program 12f of the fourth embodiment (FIG. 17).

Since the computer system of the sixth embodiment has the form described above, the SAS adaptor unit 31 can not only collect inquiry data 12d immediately after being activated but also simultaneously collect the inquiry data 12d from all the SAS devices 32c connected to the SAS adaptor unit 31, by the inquiry data collection process similar to that in FIG. 16 and the inquiry data notification process similar to that in FIG. 17. Here, the SAS adaptor unit 31 can collect the inquiry data even if a request is not given from BIOS software 30e in a boot memory unit 30b and/or file system software 30h in OS software 30g.

Seventh Embodiment

A seventh embodiment is such that, when there is a SCSI device which does not give inquiry data as a response in response to an inquiry command from an initiator, in a computer system provided with a computer and SCSI devices similar to those of the first embodiment, the location of the SCSI device is notified to a system administrator.

Figure 20:
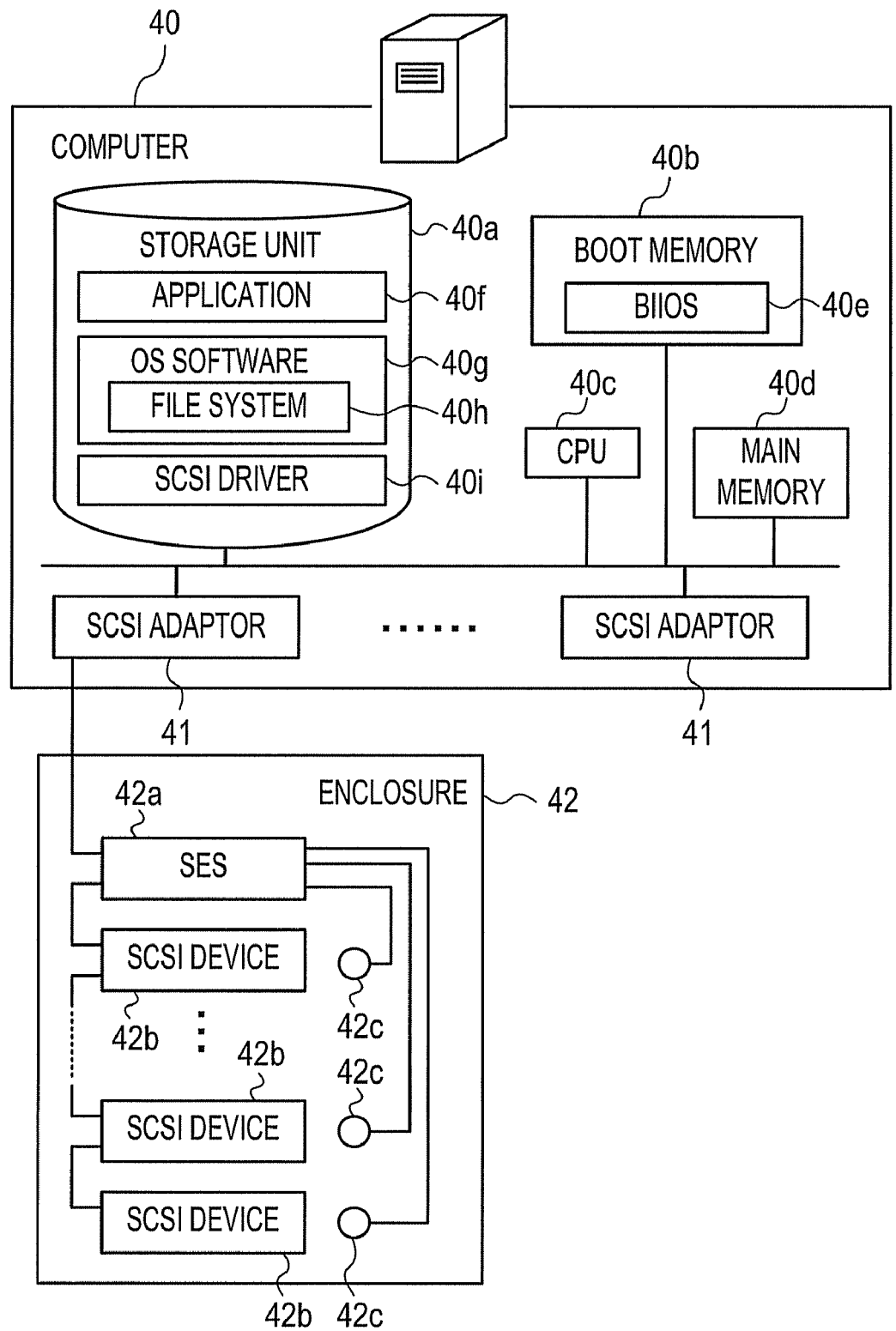
FIG. 20 is a block diagram of a computer system of a seventh embodiment.

FIG. 20 is a block diagram of the computer system of the seventh embodiment. As depicted in FIG. 20, the computer system of the seventh embodiment includes a computer 40 and an enclosure 42. Among these, the computer 40 is provided with a storage unit 40a, a boot memory unit 40b, a CPU 40c, a main memory unit 40d, and SCSI adaptor units 41, similarly to the first embodiment. Furthermore, the computer 40 stores an application 40f, OS software 40g (including file system software 40h) and a SCSI driver 40i in the storage unit 40a, similarly to the first embodiment.

On the other hand, the enclosure 42 includes SES (SCSI Enclosure Services) 42a, SCSI devices 42b and LED (Light Emitting Diode) indicators 42c. The SES 42a is a SCSI device which performs monitoring of the environment of the enclosure and control of the LED indicators 42c. The SCSI device 42b is a device provided with a function of inputting and outputting data and an interface for performing communication in accordance with the SCSI standard. This SCSI device 42b gives inquiry data as a response when an inquiry command is sent thereto, so as to store software for performing SCSI communication. The LED indicator 42c is an indicator which displays the state of the SCSI device 42b in the enclosure 42, and one LED indicator 42c is provided for each of the multiple SCSI devices 42b. In the enclosure 42, the SES 42a and the multiple SCSI devices 42b are connected via a SCSI bus cable. The SES 42a is connected to the SCSI adaptor unit 41 in the computer 40 via a SCSI bus cable.

Figure 21:
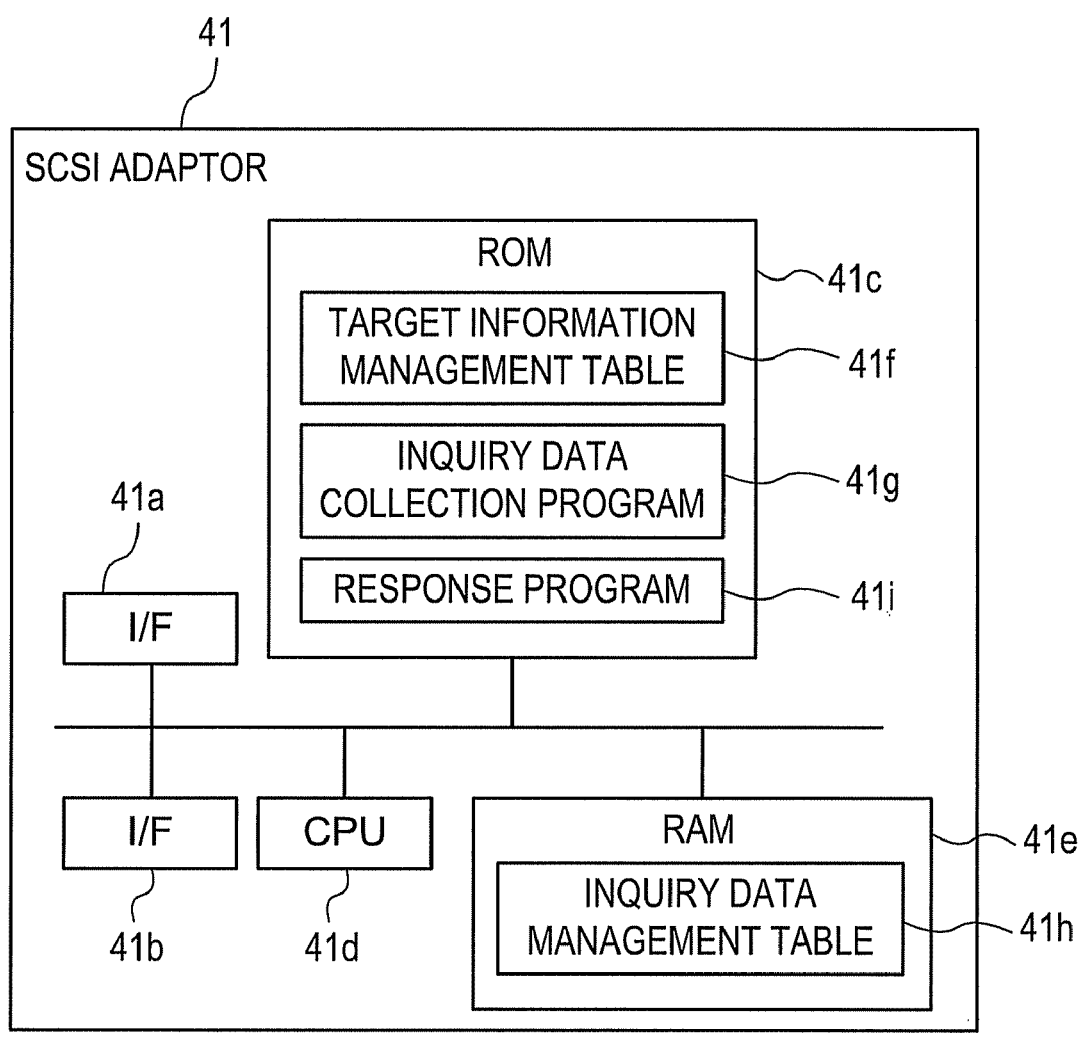
FIG. 21 is a block diagram of a SCSI adaptor unit.

FIG. 21 is a block diagram of the SCSI adaptor unit 41. As depicted in FIG. 21, the SCSI adaptor unit 41 is provided with I/F units 41a and 41b, a ROM unit 41c, a CPU 41d and a RAM unit 41e, similarly to the first embodiment. The SCSI adaptor unit 41 stores software for performing communication in accordance with the SCSI standard, in the ROM unit 11c. This software is set as an initiator in the seventh embodiment. Furthermore, a target information management table 41f, an inquiry data collection program 41g and a response program 41i are added to this software. The target information management table 41f and the response program 41i show the functions similar to the functions of the target information management table 11f (FIG. 5) and the response program 11i (FIG. 8) of the first embodiment. On the other hand, the contents of the process by the inquiry data collection program 41j are different from the contents of the process by the inquiry data collection program 11g of the first embodiment. However, the seventh embodiment is similar to the first embodiment in that the inquiry data management table 41h is generated in the RAM unit 41e by the inquiry data collection program.

In the SCSI adaptor unit 41, the inquiry data collection program 41g is automatically activated by a CPU 41d when the power supply of the SCSI adaptor unit 41 is turned on. When this inquiry data collection program 41g is activated, the inquiry data collection process is started by the CPU 41d.

Figure 22:
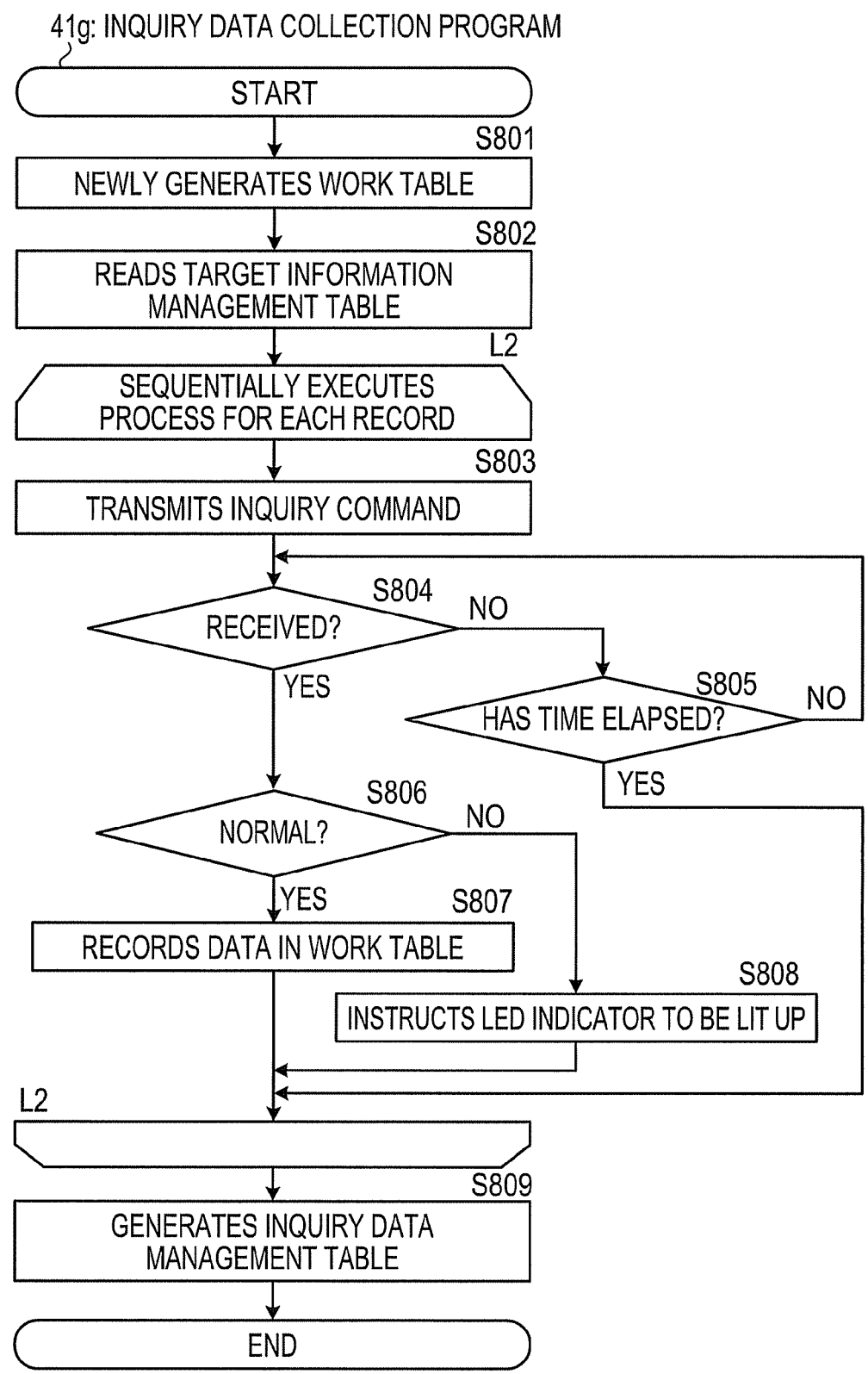
FIG. 22 is a diagram depicting the flow of an inquiry data collection process.

FIG. 22 is a diagram depicting the flow of the inquiry data collection process. After the inquiry data collection process is started, the CPU 41d generates a new work table in the RAM unit 41e at S801. The work table generated here has the same field configuration as that of the inquiry data management table 41h. At S802, the CPU 41d reads the target information management table 41f from the ROM unit 41c. After that, the CPU 41d executes a second processing loop L2.

In the second processing loop L2, the CPU 41d sequentially identifies each of all the records in the target information management table 41f read at S802, and executes the process from S803 to S808 for the identified records. At S803, the CPU 41d transmits an inquiry command including a target ID and an LUN included in a processing target record (see FIG. 7). At S804, the CPU 41d determines whether the response to the inquiry command transmitted at S803 has been received. If the response to the inquiry command transmitted at S803 has not been received, the CPU 41d at S804 branches the process to step S805.

At S805, the CPU 41d determines whether a predetermined period of time has elapsed after the inquiry command was transmitted at S803. If the predetermined period of time has not elapsed after the inquiry command was transmitted at S803, the CPU 41d branches the process at S805 and returns the process to S804. If the predetermined period of time has elapsed after transmission of the inquiry command at S803 while the CPU 11d is repeatedly executing S804 and S805, the CPU 41d advances the process from S805 and ends the process for this processing target record in the second processing loop L2.

If receiving the response to the inquiry command transmitted at S803 before elapse of the predetermined period of time while repeatedly executing S804 and S805, the CPU 41d advances the process from S804 to S806. At S608, the CPU 41d determines whether the response received at step S804 is a normal response including inquiry data. If the response received at step S804 is a normal response including inquiry data, the CPU 41d advances the process to S807. At S807, the CPU 41d performs a process for recording the inquiry data received at S804 in the work table in the RAM unit 41e. After that, the CPU 41d ends the process for this processing target record in the second processing loop L2. On the other hand, if the response received at S804 is not a normal response including inquiry data at S806, the CPU 41d at S806 branches the process to S808.

At S808, the CPU 41d instructs the SES 42a to light up an LED indicator 42c associated with a SCSI device 42b identified by the target ID included in the processing target record. FIG. 23 is a diagram of the format of an SES command. Since the SES command is well known, description thereof will be omitted. When the value of an "rqst ident" field in the SES command in FIG. 23 is set to 1, it is instructed to light up the LED indicator 42c. When the value of the field is set to 0, it is instructed to put out the light of the LED indicator 42c. After instructing lighting up of the LED indicator 42c, the CPU 41d ends the process for this processing target record in the second processing loop L2.

When finishing execution of the process from S803 to S808 for all the records in the target information management table 41f read at S802, the CPU 41d exits the second processing loop L2 and advances the process to S809. At S809, the CPU 41d reproduces the work table in the RAM unit 41e and records the work table reproduced in the RAM unit 41e as an inquiry data management table 41h. After recording the inquiry data management table 41h, the CPU 41d ends the inquiry data collection process according to FIG. 22.

Since the computer system of the seventh embodiment is configured as described above, the SCSI adaptor unit 41 performs an inquiry process by this inquiry data collection process immediately after being activated, and collects the inquiry data 12d from the SCSI devices 12 connected to the SCSI adaptor unit 41. In this case, the SCSI adaptor unit 41 collects the inquiry data 12d even if a request is not given from BIOS software 10e in a boot memory unit 10b and/or file system software 10h in OS software 10g.

Furthermore, in the seventh embodiment, a corresponding LED indicator 42c is lit up for a SCSI device 42b which does not return a normal response including inquiry data in the inquiry data collection process. Accordingly, when the computer is activated, the system administrator can immediately recognize a faulty SCSI device 42b.

Eighth Embodiment

Figure 24:
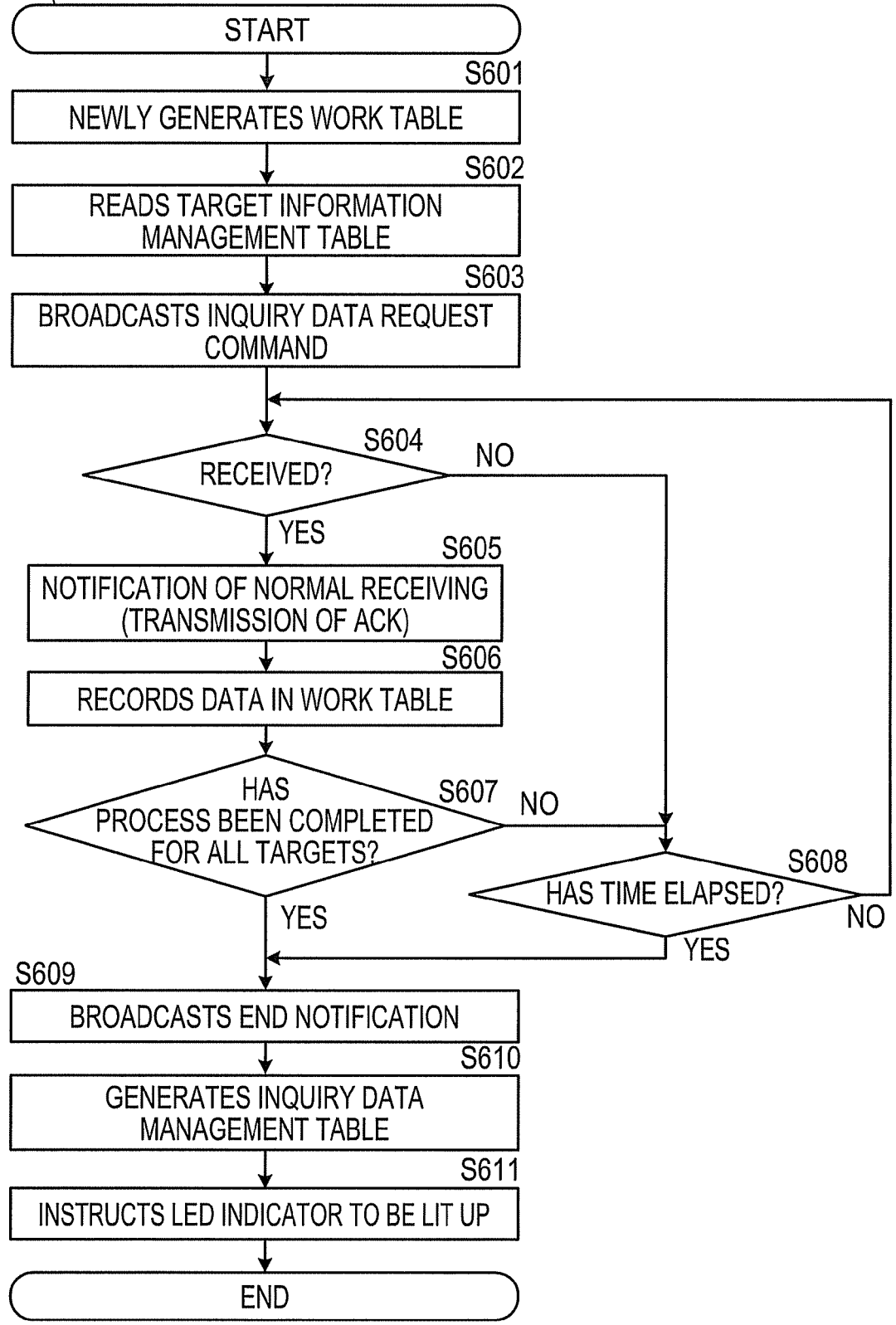
FIG. 24 is a diagram depicting the flow of an inquiry data collection process of an eighth embodiment.

An eighth embodiment is such that the LED indicator lighting-up function in the seventh embodiment is combined with the computer system of the fourth embodiment. FIG. 24 is a diagram depicting the flow of the inquiry data collection process of the eighth embodiment. In the eighth embodiment, an inquiry data management table 11h is generated (S610), and an SES is instructed to light up a corresponding LED indicator for a SCSI device 12 which has not returned a normal response including inquiry data (S611), as apparent from comparison between FIGS. 24 and 16. Therefore, according to the eighth embodiment also, the system administrator can immediately recognize a faulty SCSI device when the computer is activated.

In the first to eighth embodiments described above, any of the units 10a to 10d, 11, 20a to 20d, 21, 30a to 30d, 31, 40a to 40d, and 41 of the computers 10 to 40 may be configured by a software element and/or a hardware element (i.e., any combinations thereof). Furthermore, any of the units 11*a* to 11*e*, 21*a* to 21*e*, 31*a* to 31*e*, and 41*a* to 41*e* in the host bus adaptor and the units 12*a* to 12*c* in the SCSI device 12 may be configured by a software element and/or a hardware element (i.e., any combinations thereof).

As examples of the software element, an interface program, a driver program, a table, data, and combination of some of these are given. These may be stored in a computer-readable recording medium described later, or may be firmware which is fixedly incorporated in a storage device such as a ROM (Read Only Memory) and an LSI (Large Scale Integration).

As examples of the hardware element, an FPGA (Field Programmable Gate Array), an ASIC (Application Specific Integrated Circuit), a gate array, combination of logical gates, a signal processing circuit, an analog circuit and other circuits can be given. Among these, the logical gate may include AND, OR, NOT, NAND, NOR, flip-flop and counter circuits and the like. The signal processing circuit may include circuit elements for executing addition, multiplication, division, inversion, product-sum operation, differentiation, integration and the like of a signal value. The analog circuit may include circuit elements for executing amplification, addition, multiplication, differentiation, integration and the like.

The elements constituting each of the units 10*a* to 10*d*, 11, 20*a* to 20*d*, 21, 30*a* to 30*d*, 31, 40*a* to 40*d* and 41 of the computers 10 to 40 described before are not limited to those depicted above as examples and may be other elements equivalent to the examples. The elements constituting each of the units 11*a* to 11*e*, 21*a* to 21*e*, 31*a* to 31*e*, and 41*a* to 41*e* in the host bus adaptor, and the units 12*a* to 12*c* in the SCSI device 12 are not limited to those depicted above as examples and may be other elements equivalent to the examples.

In the first to eighth embodiments described above, any of the software 10*e* to 10*i*, 20*e* to 20*j*, 30*e* to 30*j*, and 40*e* to 40*i* in the computers 10 to 40, the programs 12*e* and 12*f* and the inquiry data 12*d* in the SCSI device 12, the programs 11*g*, 11*i*, 11*j*, 11*k*, 21*g*, 21*i*, 21*j*, 31*g*, 31*i*, 31*j*, 41*g* and 41*i* and the tables 11*f*, 11*h*, 21*f*, 21*h*, 31*f*, 31*h*, 41*f* and 41*h* in the host bus adaptor, and the software elements described before may include elements, such as a software part, a part in procedural language, an object-oriented software part, a class part, a part managed as a task, a part managed as a process, a function, an attribute, a procedure, a subroutine (software routine), a piece or part of a program code, a driver, firmware, a micro code, a code, a code segment, an extra segment, a stack segment, a program area, a data area, data, a database, a data structure, a field, a record, a table, a matrix table, an array, a variable and a parameter.

Furthermore, any of the software 10*e* to 10*i*, 20*e* to 20*j*, 30*e* to 30*j*, and 40*e* to 40*i* in the computers 10 to 40, the programs 12*e* and 12*f* and the inquiry data 12*d* in the SCSI device 12, the programs 11*g*, 11*i*, 11*j*, 11*k*, 21*g*, 21*i*, 21*j*, 31*g*, 31*i*, 31*j*, 41*g* and 41*i* and the tables 11*f*, 11 *h*, 21*f*, 21 *h*, 31*f*, 31 *h*, 41*f* and 41*h* in the host bus adaptor, and the software elements described before may be written in C language, C++, Java (trademark of U.S. Sun Microsystems, Inc.), Visual Basic (trademark of U.S. Microsoft Corporation), Perl, Ruby, or any of many other programming languages.

Furthermore, a command, a code or data included in the software 10*e* to 10*i*, 20*e* to 20*j*, 30*e* to 30*j*, and 40*e* to 40*i* in the computers 10 to 40, the programs 12*e* and 12*f* and the inquiry data 12*d* in the SCSI device 12, the programs 11*g*, 11*i*, 11*j*, 11*k*, 21*g*, 21*i*, 21*j*, 31*g*, 31*i*, 31*j*, 41*g* and 41*i* and the tables 11*f*, 11 *h*, 21*f*, 21 *h*, 31*f*, 31 *h*, 41*f* and 41*h* in the host bus adaptor, and the software elements described before may be transmitted or loaded to a computer or a computer incorporated in a machine or an apparatus via a wired network card and a wired network or via a wireless card and a wireless network.

In the transmission or loading of software described above, a data signal moves on transmission communication media, such as the wired network or the wireless network, for example, by being incorporated in a carrier wave. However, the data signal may be transferred not by the carrier wave described above but as a so-called baseband signal. Such a carrier wave is transmitted in an electrical, magnetic or electromagnetic form, or an optical, acoustic or any other form.

Here, the wired network or the wireless network is, for example, a telephone line, a network line, a cable (including an optical cable and a metal cable), a wireless link, a mobile phone access line, a PHS (Personal Handy phone System) network, a wireless LAN (Local Area Network), Bluetooth (trademark of Bluetooth Special Interest Group), vehicle-mounted type wireless communication (including DSRC (Dedicated Short Range Communication)), and a network configured by any of these. The data signal communicates information including a command, a code and data to a node or an element on the network.

An element constituting each of the software 10*e* to 10*i*, 20*e* to 20*j*, 30*e* to 30*j*, and 40*e* to 40*i* in the computers 10 to 40, the programs 12*e* and 12*f* and the inquiry data 12*d* in the SCSI device 12, the programs 11*g*, 11*i*, 11*j*, 11*k*, 21*g*, 21*i*, 21*j*, 31*g*, 31*i*, 31*j*, 41*g* and 41*i* and the tables 11*f*, 11*h*, 21*f*, 21 *h*, 31*f*, 31*h*, 41*f* and 41*h* in the host bus adaptor, and the software elements described before is not limited to the examples depicted above and may be any of other elements equivalent to the examples.

Any of the functions in the first to eighth embodiments described above may be coded and stored in a storage area of a computer-readable recording medium. In this case, a program which realizes the function can be provided for a computer or a computer incorporated in a machine or an apparatus via the computer-readable recording medium. By reading the program from the storage area of the computer-readable recording medium and executing the program, the computer or the computer incorporated in a machine or an apparatus can realize the function.

Here, the computer-readable recording medium refers to a recording medium in which information such as a program and data is accumulated by an electrical, magnetic, optical, chemical, physical or mechanical operation and the information is held in a state of being able to be read by a computer.

As an example of the electrical or magnetic operation, writing of data to an element on a ROM (Read Only Memory) configured by a fuse can be given. As an example of the magnetic or physical operation, development of toner onto a latent image on a paper medium can be given. Information recorded on the paper medium can be, for example, read optically. As an example of the optical and chemical operation, formation of a thin film or unevenness on a substrate can be given. Information recorded in the form of unevenness can be, for example, read optically. As examples of the chemical operation, redox reaction on a substrate, and formation of an oxide film, formation of a nitride film and photo resist development on a semiconductor substrate can be given. As an example of the physical or mechanical operation, formation of unevenness on an embossed card or punching of a hole in a paper medium can be given.

Some computer-readable recording media can be detachably attached to a computer or a computer incorporated in a machine or an apparatus. As examples of the detachable computer-readable recording medium, there are given DVD (including DVD-R, DVD-RW, DVD-ROM and DVD-RAM), +R/+WR, BD (Blu-ray Disk) (including BD-R, BD-RE and BD-ROM), CD (Compact Disk) (including CD-R, CD-RW and CD-ROM), MO (Magneto Optical) disk, other optical disk media, flexible disk (including FLOPPY DISK), other magnetic disk media, memory card (such as COMPACT FLASH), SMART MEDIA, ST CARD, MEMORY STICK, and MMC), magnetic tape and other tape media, and a storage device which includes any of these. Some storage devices further include a DRAM (Dynamic Random Access Memory) or an SRAM (Static Random Access Memory).

Some computer-readable recording media are fixedly attached to a computer or a computer incorporated in a machine or an apparatus. As examples of this kind of computer-readable medium, a hard disk, DRAM, SRAM, ROM, EEPROM (Electronically Erasable and Programmable Read Only Memory), flash memory and the like can be given.

According to an aspect of the embodiments of the invention, any combinations of the described features, functions, operations, and/or benefits can be provided. The embodiments can be implemented as an apparatus (a machine) that includes computing hardware (i.e., computing apparatus), such as (in a non-limiting example) any computer that can store, retrieve, process and/or output data and/or communicate (network) with other computers (e.g., discussed computers, devices, and/or adapters). According to an aspect of an embodiment, the described features, functions, operations, and/or benefits can be implemented by and/or use computing hardware and/or software. The apparatus comprises a controller (CPU) (e.g., a hardware logic circuitry based computer processor that processes or executes instructions, namely software/program), computer readable recording media, transmission communication media interface (network interface), and/or a display device, all in communication through a data communication bus. The results produced can be displayed on a display of the computing hardware. A program/software implementing the embodiments may be recorded on computer readable media comprising computer-readable recording media. The program/software implementing the embodiments may also be included/encoded and transmitted over transmission communication media.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An information processing apparatus including a controller comprising:
   a first host bus adaptor which has a first storage section and expands a function of the information processing apparatus, and
   multiple first input/output devices connected to the first host bus adaptor,
      wherein the first host bus adaptor includes a first computer processor that activates a first data collection inquiry process between when the information processing apparatus is powered and when the controller of the information processing apparatus, according to an open boot program (OBP), requests device information by way of a driver to the first host bus adaptor, that executes the first data collection inquire process to issue a first inquiry to each of the first input/output devices, and that stores a first response to the first inquiry obtained from each of the first input/output devices in the first storage section; and
   a second host bus adaptor which has a second storage section and expands a function of the information processing apparatus, and
   multiple second input/output devices connected to the second host bus adaptor,
      wherein the second host bus adaptor includes a second processor that activates a second data collection inquiry process between when the information processing apparatus is powered and when the computer processor of the information processing apparatus, according to an open boot program (OBP), requests device information by way of a driver to the second host bus adaptor, that executes the second data collection inquire process to issue a second inquiry to each of the second input/output devices independently from the first inquiry, and that stores a second response to the second inquiry obtained from each of the second input/output devices in the second storage section.

2. The information processing apparatus according to claim 1, wherein the first data collection inquiry process issues a first inquiry to any one input/output device included in the first input/output devices and issues a second inquiry to another input/output device included in the first input/output devices after obtaining a response to the first inquiry from the any one input/output device.

3. The information processing apparatus according to claim 2, wherein, if the response to the first inquiry from the any one input/output device is not obtained, the first data collection inquiry process issues the second inquiry to another input/output device included in the first multiple input/output devices after a lapse of a predetermined period of time.

4. The information processing apparatus according to claim 1, wherein the first data collection inquiry process issues the first inquiry to each of the first input/output devices at same time.

5. The information processing apparatus according to claim 1, wherein the first data collection inquiry process notifies the first response which the first data collection inquiry process stores in the first storage section, to the OBP.

6. A host bus adaptor in communication with a plurality of input/output devices and included in an information processing apparatus that includes a controller and other host bus adaptors, the host bus adaptor comprising:
   a computer controller upon receiving power supply automatically activating a data collection inquiry process between when the information processing apparatus is powered and when the controller of the information processing apparatus, according to an open boot program (OBP), requests device information by way of a driver to the host bus adaptor, to issue an inquiry, independent of the other host bus adaptors, to each input/output device and storing a response to the inquiry obtained from each input/output device.

7. A method of controlling an information processing apparatus including a controller and a first and a second host bus adaptor, first multiple input/output devices connected to the first host bus adaptor and second multiple input/output devices connected to the second host bus adaptor, the method comprising:
   activating, by the first host bus adaptor, a first data collection inquiry process between when the information processing apparatus is powered and when the controller of the information processing apparatus, according to an open boot program (OBP), requests device information by way of a driver to the first host bus adaptor, and issuing a first inquiry from the first host bus adaptor to each of the first input/output devices;

storing a first response to the first inquiry obtained from each of the first input/output devices in a first storage section of the first host bus adaptor;

activating, by the second host bus adaptor, a second data collection inquiry process between when the information processing apparatus is powered and when the controller of the information processing apparatus, according to an open boot program (OBP), requests device information by way of a driver to the second host bus adaptor, and issuing a second inquiry from the second host bus adaptor to each of the second input/output devices independently from the first inquiry; and storing a second response to the second inquiry obtained from each of the second input/output devices in a second storage section of the second host bus adaptor.

8. The control method according to claim 7, wherein the issuing of the first inquiry to each of the first input/output devices comprises issuing a first inquiry to any one input/output device included in the first input/output devices and issuing a second inquiry to another input/output device included in the first input/output devices after obtaining a response to the first inquiry from the any one input/output device.

9. The control method according to claim 8, wherein the issuing of the first inquiry to each of the first input/output devices comprises if the response to the first inquiry from the any one input/output device is not obtained, issuing the second inquiry to another input/output device included in the first input/output devices after a lapse of a predetermined period of time.

10. The control method according to claim 7, wherein the issuing of the first inquiry to each of the first input/output devices comprises issuing the first inquiry to each of the first input/output devices at same time.

11. The control method according to claim 8, further comprising notifying the first response which the first data collection inquiry process stores, to the OBP.

12. An apparatus, comprising:
a computer controller executing a boot procedure when the apparatus is powered; and
a plurality of host bus adaptors each in communication with respective plurality of input/output devices and each comprising:
a computer controller, upon receiving power, automatically activating a data collection inquiry process when the apparatus is powered prior to the computer controller of the apparatus, according to an open boot program (OBP), requests device information by way of a driver to the host bus adaptor, to issue an inquiry to the respective input/output devices and storing a response to the inquiry obtained from the respective input/output devices.

* * * * *

UNITED STATES PATENT AND TRADEMARK OFFICE
CERTIFICATE OF CORRECTION

PATENT NO. : 8,281,057 B2
APPLICATION NO. : 12/402164
DATED : October 2, 2012
INVENTOR(S) : Takaaki Kitamura Page 1 of 1

It is certified that error appears in the above-identified patent and that said Letters Patent is hereby corrected as shown below:

Title Page, Item [56] delete "JP 01-54228, 06/16/1989" and insert -- JP 01-154228, 06/16/1989 --.

In the Claims:

Column 22, Line 12, In Claim 11, delete "stores," and insert -- stores --, therefor.

Signed and Sealed this
Twenty-first Day of May, 2013

Teresa Stanek Rea
*Acting Director of the United States Patent and Trademark Office*